United States Patent
Wang et al.

(10) Patent No.: US 11,428,362 B2
(45) Date of Patent: Aug. 30, 2022

(54) TWO-AXIS GIMBAL SYSTEM FOR SUPPORTING A CAMERA

(71) Applicant: Hangzhou Zero Zero Technology Co., Ltd., Zhejiang (CN)

(72) Inventors: Zhaozhe Wang, Zhejiang (CN); Qiong Liu, Zhejiang (CN)

(73) Assignee: Hangzhou Zero Zero Technology Co., Ltd.

( * ) Notice: Subject to any disclaimer, the term of this patent is extended or adjusted under 35 U.S.C. 154(b) by 702 days.

(21) Appl. No.: 16/332,714

(22) PCT Filed: Jan. 11, 2019

(86) PCT No.: PCT/CN2019/071374
§ 371 (c)(1),
(2) Date: Mar. 12, 2019

(87) PCT Pub. No.: WO2020/143029
PCT Pub. Date: Jul. 16, 2020

(65) Prior Publication Data
US 2021/0362877 A1     Nov. 25, 2021

Related U.S. Application Data

(63) Continuation-in-part of application No. PCT/CN2018/122020, filed on Dec. 19, 2018.
(Continued)

(51) Int. Cl.
*F16M 11/12*      (2006.01)
*G03B 15/00*      (2021.01)
(Continued)

(52) U.S. Cl.
CPC ......... *F16M 11/123* (2013.01); *G03B 15/006* (2013.01); *G03B 17/561* (2013.01);
(Continued)

(58) Field of Classification Search
CPC .................................................. G03B 17/561
See application file for complete search history.

(56) References Cited

U.S. PATENT DOCUMENTS

| 7,561,784 B2 | 7/2009 | Wescott et al. |
| 10,895,801 B2* | 1/2021 | Bin ............. G03B 17/561 |

(Continued)

FOREIGN PATENT DOCUMENTS

| CN | 105517903 A | 4/2016 |
| CN | 205366095 U | 7/2016 |

(Continued)

OTHER PUBLICATIONS

International Search Report and Written Opinion (International Application No. PCT/CN2019/071374); dated Oct. 18, 2019; 10 pages.

(Continued)

*Primary Examiner* — Leon W Rhodes, Jr.
(74) *Attorney, Agent, or Firm* — Endurance Law Group PLC

(57) ABSTRACT

An aerial system includes a body; a lift mechanism; and a two-axis gimbal assembly. A camera housing of the gimbal assembly extends between a first endwall and a second endwall along a pitch axis. An opening in the first endwall receives a camera communication cable. The camera communication cable is coupled to a camera and a control board. The camera housing includes an inner surface that defines a positioning cavity. A positioning cavity in the camera housing receives the camera. A pitch assembly of the support assembly rotates the camera housing about the pitch axis.

17 Claims, 18 Drawing Sheets

Related U.S. Application Data

(60) Provisional application No. 62/607,441, filed on Dec. 19, 2017.

(51) Int. Cl.
  *G03B 17/56* (2021.01)
  *B64D 47/08* (2006.01)
  *B64C 39/02* (2006.01)

(52) U.S. Cl.
  CPC ...... *B64C 39/024* (2013.01); *B64C 2201/127* (2013.01); *B64D 47/08* (2013.01)

(56) References Cited

U.S. PATENT DOCUMENTS

| | | | |
|---|---|---|---|
| 2014/0049643 A1 | 2/2014 | Segerstrom et al. | |
| 2014/0205276 A1 | 7/2014 | Johnston et al. | |
| 2017/0174362 A1 | 6/2017 | Zhao et al. | |
| 2017/0336019 A1* | 11/2017 | Liu | H05K 1/0281 |
| 2017/0336700 A1* | 11/2017 | Liu | F16M 11/18 |

FOREIGN PATENT DOCUMENTS

| | | | | |
|---|---|---|---|---|
| CN | 106369259 | A | * | 2/2017 |
| CN | 205916340 | U | | 2/2017 |
| CN | 108238273 | A | | 7/2018 |
| CN | 208102363 | U | | 11/2018 |
| JP | 2005-025085 | A | | 1/2005 |
| KR | 101598411 | B1 | | 2/2016 |
| WO | 2012/170673 | A1 | | 12/2012 |
| WO | WO-2019061781 | A1 | * | 4/2019 ............ B64D 17/08 |

OTHER PUBLICATIONS

International Preliminary Report on Patentability (International Application No. PCT/CN2018/122020); dated Nov. 15, 2019; 31 pages.

International Search Report and Written Opinion (International Application No. PCT/CN2018/122020); dated Mar. 20, 2019; 9 pages.

* cited by examiner

TWO-AXIS GIMBAL SYSTEM FOR SUPPORTING A CAMERA

CROSS-REFERENCE TO RELATED APPLICATIONS

This application is a national phase application of International Patent Application No. PCT/CN2019/071374, filed Jan. 11, 2019 and a continuation-in-part of International Patent Application No. PCT/CN2018/122020, filed Dec. 19, 2018, which claims the benefit of U.S. Provisional Patent Application Ser. No. 62/607,441, filed Dec. 19, 2017 the disclosures of which are hereby incorporated by reference in their entirety.

TECHNICAL FIELD

This invention relates generally to a two-axis gimbal system for use in supporting a video camera assembly from an aerial drone. More specifically, the present disclosure relates to a two-axis gimbal system that includes a pitch axis motor assembly to pivot a camera module around a pitch axis and a roll axis motor assembly to pivot the camera module around a roll axis.

BACKGROUND OF THE INVENTION

Unmanned aerial vehicles or drones are aerial vehicles without a human operator or pilot aboard that may be used, for example, to take images from a high altitude. Drones tend to be difficult to control, as the drone has multiple degrees of freedom including translational motion (such as longitudinal, lateral, and vertical) and rotational motion (such as pitch, roll, and yaw). Translational motion typically changes the position of the drone, and rotational motion typically changes the orientation of the drone. For drones that are lifted or propelled using four rotors, which are often referred to as quadrotor, two rotational motions are coupled with two translational motions (such as pitch-longitudinal motion and roll-lateral motion), resulting in a total of four degrees of freedom (e.g., pitch-longitudinal, roll-lateral, vertical, and yaw).

Typically, the position and/or orientation of the drone is controlled remotely, such as with a hand-held device or controller, a mobile computing device including smartphones and tablet computers. However, control of the orientation and/or movement of the drone can be difficult when the drone has an onboard camera. These drones, which may be referred to as camera drones or camera UAVs, may be used by the operator to take a photograph of himself/herself (i.e., a selfie), agriculture monitoring, real-estate advertisement, recording of sporting events, property management, and/or geographical survey. The camera is typically mounted on a multi-degree rotor or gimbal, and the pointing direction (orientation) of the camera is free to rotate independently relative to the position and/or orientation of the drone.

To ease the operation burden on the operator, many drone and gimbals have self-stabilizing features, which are typically controlled by onboard accelerometers or gyroscopes and associated software programs or logic. The self-stabilizing features of the drone continuously adjust the motor so that the drone stays at the target position when the drone is subjected to external disturbance(s), such as wind and impact by/with other objects. Similarly, self-stabilizing features of the gimbal continuously adjust the rotor so that the gimbal returns to the target orientation when the gimbal is subjected to the external disturbance(s). With the self-stabilizing feature, the drone/gimbal can remain at the target position/orientation, even with no input or command from the operator. Nevertheless, such systems tend to have complicated line routings which take up space and add unneeded weight to the system. Moreover, in such systems, the load center of gravity of the camera is usually along one/more gimbal motor pivot axis (axes). As a result, the power consumption of the gimbal at a normal position increases since the motors must continue to generate torque to counteract residual torque of the cables attached to the camera. The present disclosure is aimed at solving the problems identified above.

SUMMARY OF THE INVENTION

In one embodiment of the present invention, an aerial system is provided. The aerial system includes a body; a lift mechanism; and a two-axis gimbal assembly. The lift mechanism is coupled to the body. The two-axis gimbal assembly coupled to the body. The two-axis gimbal assembly includes a camera housing and a support assembly. The camera housing extends between a first endwall and a second endwall along a pitch axis. The first endwall includes an opening extending therethrough. The opening is configured to receive a camera communication cable. The camera communication cable is coupled to a camera and a control board. The camera housing includes an inner surface that defines a positioning cavity. The positioning cavity is configured to receive the camera therein. The support assembly includes a pitch assembly and a roll assembly. The pitch assembly is coupled to the camera housing for rotating the camera housing about the pitch axis. The pitch assembly includes a pitch motor and a pitch support member. The pitch motor is coupled to the pitch support member. The pitch support member includes a base, a first arm, and a second arm. The second arm is opposite the first arm. The first arm and the second arm extend outwardly from the base. The first arm is configured to support the camera communication cable. The second arm is coupled to the second endwall of the camera housing. The roll assembly is coupled to the body and the pitch assembly. The roll assembly is configured to rotate the pitch assembly about a roll axis. The roll axis is perpendicular to the pitch axis. The roll assembly includes a roll motor and a roll support member. The roll motor is coupled to the roll support member. The roll motor is coupled to the control board with a flexible printed circuit. The roll support member includes an outer surface and a recessed portion defined along the outer surface. The recessed portion is configured to receive the flexible printed circuit.

In another embodiment of the present invention, a two-axis gimbal assembly for use with an aerial system where the aerial system includes a body and a lift mechanism coupled to the body. The two-axis gimbal assembly includes a control board; a camera; a camera housing; and a support assembly. The camera housing extends between a first endwall and a second endwall along a pitch axis. The first endwall includes an opening extending therethrough. The opening is configured to receive a camera communication cable. The camera communication cable is coupled to the camera and the control board. The camera housing includes an inner surface that defines a positioning cavity. The positioning cavity is configured to receive the camera therein. The support assembly is coupled to the body of the aerial system and includes a pitch assembly and a roll assembly. The pitch assembly is coupled to the camera housing for rotating the camera housing about the pitch axis. The pitch assembly includes a pitch motor and a pitch support member. The pitch motor is coupled to the pitch support member. The pitch support member includes a base, a first arm, and a second arm. The second arm is opposite the first arm. The first arm and the second arm extend outwardly from the base. The first arm is configured to support the camera communication cable. The second arm is coupled to the second endwall of the camera housing. The roll assembly is coupled to the body and the pitch assembly. The roll assembly is configured to rotate the pitch assembly about a roll axis. The roll axis is perpendicular to the pitch axis. The roll assembly includes a roll motor and a roll support member. The roll motor is coupled to the roll support member. The roll motor is coupled to the control board with a flexible printed circuit. The roll support member includes an outer surface and a recessed portion defined along the outer surface. The recessed portion is configured to receive the flexible printed circuit.

In a further embodiment of the present invention, a support assembly for supporting a camera from an aerial system includes a pitch assembly and a roll assembly. The aerial system includes a body and a flight mechanism coupled to the body. The pitch assembly is adapted to couple to a camera housing for rotating the camera housing about a pitch axis. The pitch assembly includes a pitch motor and a pitch support member. The pitch motor is coupled to the pitch support member. The pitch support member includes a base, a first arm, and a second arm. The second arm is opposite the first arm. The first arm and the second arm extend outwardly from the base. The first arm is configured to support a camera communication cable. The second arm coupled to the camera housing. The roll assembly is coupled to the body and the pitch assembly. The roll assembly is configured to rotate the pitch assembly about a roll axis. The roll axis is perpendicular to the pitch axis. The roll assembly includes a roll motor and a roll support member. The roll motor is coupled to the roll support member. The roll motor is coupled to a control board with a flexible printed circuit. The roll support member includes an outer surface and a recessed portion defined along the outer surface. The recessed portion is configured to receive the flexible printed circuit.

BRIEF DESCRIPTION OF THE DRAWINGS

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings.

Figure 1:
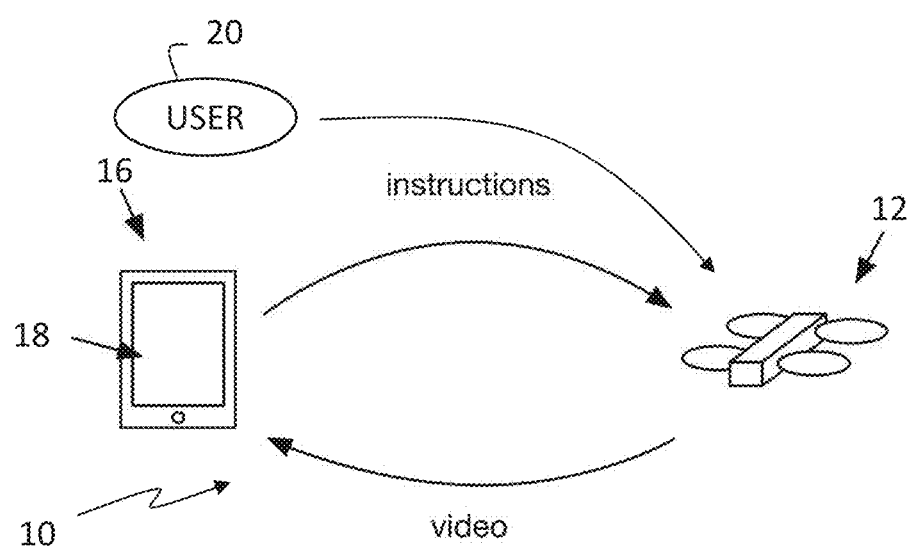
FIG. 1 is a schematic representation of an aerial system and a system for controlling the aerial system, according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention.

DETAILED DESCRIPTION

The following description of the embodiments of the invention is not intended to limit the invention to these embodiments, but rather to enable any person skilled in the art to make and use this invention. With reference to the drawings and in operation, an aerial system and a two-axis gimbal system for the aerial device are described in detail below.

The present invention overcomes the problems of at least some known aerial systems by providing an aerial system including a two-axis gimbal assembly that optimizes the routing path of the cable connection assembly and minimizing the volume of the cable assembly making the entire system smaller. The system relates to a two-axis gimbal system configured to mount a secure a load, especially a camera module. The system functions to adjust the camera attitude and automatically maintain stability. The system has a smaller size, simpler line routing and easier installation compared to traditional gimbal systems.

In one embodiment, the aerial system includes a body; a lift mechanism; and a two-axis gimbal assembly. The lift mechanism is coupled to the body. The two-axis gimbal assembly coupled to the body. The two-axis gimbal assembly includes a camera housing and a support assembly.

The camera housing extends between a first endwall and a second endwall along a pitch axis. The first endwall includes an opening extending therethrough. The opening is configured to receive a camera communication cable. The camera communication cable is coupled to a camera and a control board. The camera housing includes an inner surface that defines a positioning cavity. The positioning cavity is configured to receive the camera therein.

The support assembly includes a pitch assembly and a roll assembly. The pitch assembly is coupled to the camera housing for rotating the camera housing about the pitch axis. The pitch assembly includes a pitch motor and a pitch support member. The pitch motor is coupled to the pitch support member. The pitch support member includes a base, a first arm, and a second arm. The second arm is opposite the first arm. The first arm and the second arm extend outwardly from the base. The first arm is configured to support the camera communication cable. The second arm is coupled to the second endwall of the camera housing. The roll assembly is coupled to the body and the pitch assembly. The roll assembly is configured to rotate the pitch assembly about a roll axis. The roll axis is perpendicular to the pitch axis. The roll assembly includes a roll motor and a roll support member. The roll motor is coupled to the roll support member. The roll motor is coupled to the control board with a flexible printed circuit. The roll support member includes an outer surface and a recessed portion defined along the outer surface. The recessed portion is configured to receive the flexible printed circuit.

The following description of the embodiments of the invention is not intended to limit the invention to these embodiments, but rather to enable any person skilled in the art to make and use this invention. With reference to the drawings and in operation, a system 10 for controlling an aerial system 12 including a two-axis gimbal system 14 for supporting a camera on the aerial system 12 or other unmanned aerial vehicle, is provided. The system 10 may include a remote device 16 with a control client 18. The control client 18 provides a user interface that allows a user 20 to send instructions to the aerial system 12 to control operation thereof. As discussed in more depth below, the aerial system 12 includes one or more cameras for obtaining pictures and/or video which may be sent to the remote device 16 and/or stored in memory on the aerial system 12.

Overview of the System 10 and the Aerial System 12

Figure 2:
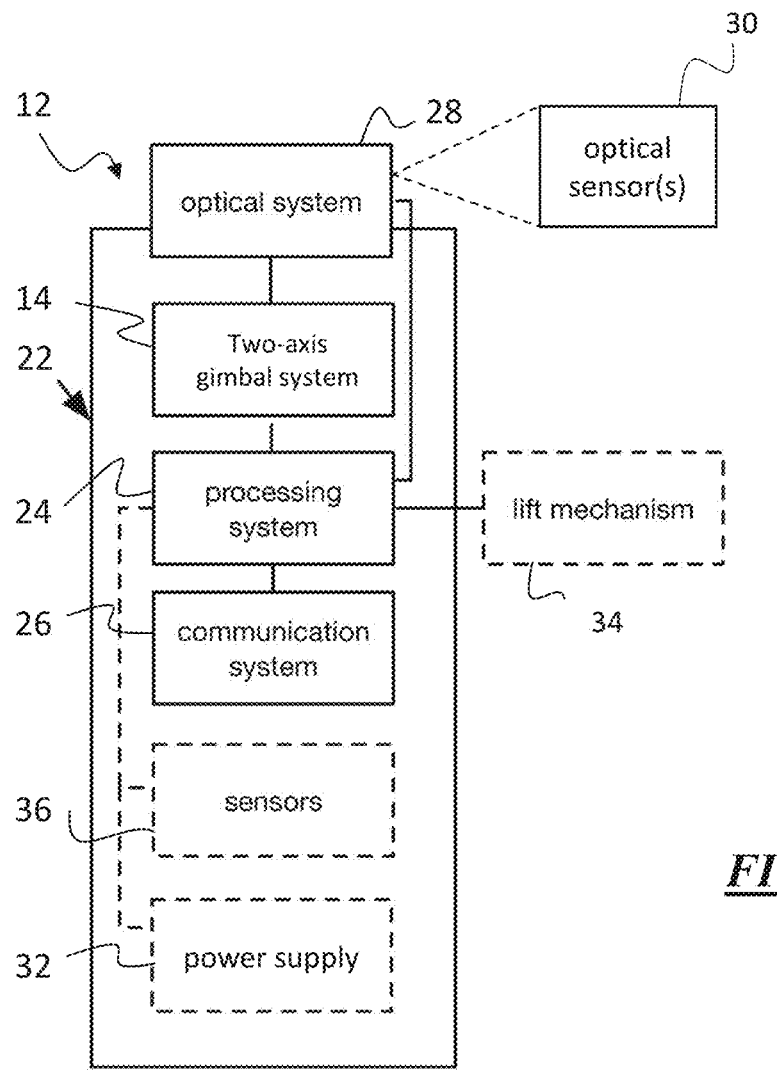
FIG. 2 is another schematic representation of the aerial system, according to an embodiment of the present invention.

An exemplary system 10 including the aerial system 12 is shown in FIGS. 1 and 2. The control client 18 of the aerial system 12 functions to receive data from the aerial system 12, including video images and/or video, and control visual display on the remote device 16. The control client 18 may also receive operation instructions and facilitate aerial system 12 remote control based on operation instructions. The control client 18 is preferably configured to execute on a remote device 16, but can alternatively be configured to execute on the aerial system 12 or on any other suitable system. As discussed above, and more fully below, the aerial system 12 may be controlled solely without direct or physical interaction with the remote device 16.

The control client 18 can be a native application (e.g., a mobile application), a browser application, an operating system application, or be any other suitable construct.

The remote device 16 executing the control client 18 functions to display the data (e.g., as instructed by the control client 18), receive user inputs, compute the operation instructions based on the user inputs (e.g., as instructed by the control client 18), send operation instructions to the aerial system 12, store control client information (e.g., associated aerial system identifiers, security keys, user account information, user account preferences, etc.), or perform any other suitable functionality. The remote device 16 can be a user device (e.g., smartphone, tablet, laptop, etc.), a networked server system, or be any other suitable remote computing system. The remote device 16 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 16 can include a display (e.g., a touch-sensitive display including a touchscreen overlaying the display), a set of radios (e.g., Wi-Fi, cellular, BLE, etc.), and a set of orientation sensors. However, the remote device 16 can include any suitable set of components.

The aerial system 12 functions to fly within a physical space, capture video, stream the video in near-real time to the remote device 16, and operate based on operation instructions received from the remote device 14.

The aerial system 12 can additionally process the video (e.g., video frames) prior to streaming the video to the remote device 16 and/or audio received from an onboard audio sensor; generate and automatically operate based on its own operation instructions (e.g., to automatically follow a subject); or perform any other suitable functionality. The aerial system 12 can additionally function to move the optical sensor's field of view within the physical space. For example, the aerial system 12 can control macro movements (e.g., large FOV changes, on the order of meter adjustments), micro movements (e.g., small FOV changes, on the order of millimeter or centimeter adjustments), or any other suitable movement.

The aerial system 12 can perform certain functionality based on onboard processing of sensor data from onboard sensors. This functionality may include, but is not limited to:

As shown in FIG. 2, the aerial system 12 can include a body 22 (or fuselage), a processing system 24, a communication system 26, and an optical system 28. The two-axis gimbal system 14 mounts the optical system 28 to the body 22. The aerial system 12 can additionally or alternatively include one or more optical sensors 30, power supply 32, lift mechanisms 34, additional sensors 46, or any other suitable component (see below).

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

The body 22 of the aerial system 12 functions to support, mechanically protect, and/or retain the aerial system components. The body 22 can define a lumen, be a platform, or have any suitable configuration. The body 22 can be enclosed, open (e.g., a truss), or have any suitable construction. The body 22 can be made of metal, plastic (e.g., polymer), carbon composite, or any other suitable material. The body 22 can define a longitudinal axis X, a lateral axis Y, a transverse axis Z, a front end, a back end (e.g., opposing the front end along the longitudinal axis), a top, a bottom (e.g., opposing the top along the transverse axis), or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 22 can be otherwise configured.

The body 22 preferably substantially encapsulates the communication system 26, power supply 32, and processing system 24, but can be otherwise configured. The body 22 can include a platform, a housing, or have any other suitable configuration. In one variation, the body 22 includes a main body housing the communication system 26, power supply 32, and processing system 24.

The processing system 24 of the aerial system 12 functions to control aerial system operation and includes a control board assembly 38. The processing system 24 can: stabilize the aerial system 12 during flight (e.g., in an embodiment in which coaxial rotors are used, control the rotors to minimize aerial system wobble in-flight); receive, interpret, and operate the aerial system 12 based on remote control instructions; and receive operation instructions from the communication system 26, interpret the operation instructions into machine instructions, and control aerial system components based on the machine instructions (individually or as a set).

The processing system 24 can additionally or alternatively process the images recorded by the camera, stream images to the remote device 18 (e.g., in real- or near-real time), or perform any other suitable functionality. The processing system 24 can include one or more: processors (e.g., CPU, GPU, microprocessor, etc.), memory (e.g., Flash, RAM, etc.), or any other suitable processing component. In one variation, the processing system 24 can additionally include dedicated hardware that automatically processes the images (e.g., de-warps the image, filters the image, crops the image, etc.) prior to transmission to the remote device 16. The processing system 24 is preferably connected to the active components of the aerial system 12 through the control board 38 and mounted to the body 22, but can alternatively be otherwise related to aerial system components.

The control board assembly 38 includes a main control board 40 and connector devices 42. The main control board 40 includes a processor for executing computer-readable instructions, wherein the control board assembly 38 is coupled via the connector devices 42 to the camera module, the pitch assembly, and the roll assembly for data transmission, control signal transmission, and power supply (discussed below). The control board assembly 38 includes one or more processors configured to execute one or more software programs for controlling the operation of the system 10 and/or the aerial device. In an example, the control board assembly 38 may receive operation instructions (such as from various components), interpret the operation instructions into machine instructions, and control the system 10 based on the machine instructions (individually or as a set). The control board assembly 38 may additionally or alternatively process images recorded by the camera module, stream images to a remote device 16 (e.g., in real- or near-real time), and/or perform any other suitable functionality. The processor(s) of the control board assembly 38 may be a CPU, GPU, and/or the like. In addition, the control board assembly 38 may include a memory (such as a Flash memory, RAM, etc.), or any other suitable processing component. In an embodiment, the control board assembly 38 may also include dedicated hardware that automatically processes images obtained from the camera module (e.g., de-warps the image, filters the image, crops the image, etc.) prior to transmission.

The processing system 24 is preferably configured to receive and interpret measurements sampled by the sensors 30, 36, more preferably by combining measurements sampled by disparate sensors (e.g., combining camera and accelerometer data). The aerial system 12 can include one or more processing systems, wherein different processors can perform the same functionality (e.g., function as a multi-core system), or be specialized. The processing system 24 is preferably powered by the power supply 32, but can be otherwise powered. The processing system 24 is preferably connected to and controls the sensors 30, 36, communication system 26, and lift mechanism 34, but can additionally or alternatively be connected to and interact with any other suitable component.

The communication system 26 of the aerial system 12 functions to send and/or receive information from the remote device 16. The communication system 26 is preferably connected to the processing system 24, such that the communication system 26 sends and/or receives data from the processing system 24, but can alternatively be connected to any other suitable component. The aerial system 12 can include one or more communication systems 26 of one or more types. The communication system 26 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 26. The communication system 26 preferably shares at least one system protocol (e.g., BLE, RF, etc.) with the remote device 16, but can alternatively communicate with the remote device 16 via an intermediary communication system (e.g., a protocol translation system). However, the communication system 26 can be otherwise configured.

The optical system 28 functions to record images of the physical space proximal the aerial system 12. The optical system 28 is preferably mounted to the body 22 via the two-axis gimbal system 14 discussed further below, but can alternatively be statically mounted to the body 22, removably mounted to the body 22, or otherwise mounted to the body 20. The optical system 28 is preferably mounted to the bottom end of the body 22, but can optionally be mounted to the front, top, back end, or any other suitable portion of the body 22. The optical system 28 is preferably connected to the processing system 24, but can alternatively be connected to the communication system 26 or to any other suitable system. The optical system 28 can additionally include dedicated image processing hardware that automatically processes images recorded by the camera prior to transmission to the processor or other endpoint. The aerial system 12 can include one or more optical systems 28 of same or different type, mounted to the same or different position. In one variation, the aerial system 12 includes a first optical system 28, mounted to the front end of the body 22, and a second optical system 28, mounted to the bottom of the body 22. The first optical system 28 can actuate about a pivotal support, and the second optical system 28 can be substantially statically retained relative to the body 22, with the respective active surface substantially parallel the body bottom. The first optical system 28 can include a high-definition optical sensor 30, while the second optical system 28 can include a low definition optical sensor 30. However, the optical system or systems 28 can be otherwise configured.

The optical system 28 can include one or more optical sensors 30. The one or more optical sensors 30 can include: a single lens camera (e.g., CCD camera, CMOS camera, etc.), a stereo-camera, a hyperspectral camera, a multispectral camera, or any other suitable image sensor. However, the optical system 28 can be any other suitable optical system 28. The optical system 28 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 30 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 30, but can alternatively have any suitable shape. The image frame preferably defines aspects of the images sampled by the optical sensor 30 (e.g., image dimensions, resolution, pixel size and/or shape, etc.). The optical sensor 30 can optionally include a zoom lens, digital zoom, fisheye lens, filter, or any other suitable active or passive optical adjustment. Application of the optical adjustment can be actively controlled by the controller, manually controlled by the user 20 (e.g., wherein the user manually sets the adjustment), controlled by the remote device 16, or otherwise controlled. In one variation, the optical system 28 can include a housing enclosing the remainder of the optical system components, wherein the housing is mounted to the body 22 discussed further below. However, the optical system 28 can be otherwise configured.

The power supply 32 of the aerial system 12 functions to power the active components of the aerial system 12. The power supply 32 is preferably mounted to the body 22, and electrically connected to all active components of the aerial system 12 (e.g., directly or indirectly), but can be otherwise arranged. The power supply 32 can be a primary battery, secondary battery (e.g., rechargeable battery), fuel cell, energy harvester (e.g., solar, wind, etc.), or be any other suitable power supply. Non-limiting examples of secondary batteries include batteries including lithium chemistry (e.g., lithium ion, lithium ion polymer, etc.), nickel chemistry (e.g., NiCad, NiMH, etc.), or batteries with any other suitable chemistry.

A lift mechanism 34 of the aerial system 12 functions to enable aerial system flight. The lift mechanism 34 preferably includes a set propeller blades driven by one or more motors (not shown in FIG. 2), but can alternatively include any other suitable propulsion mechanism. The lift mechanism 34 is preferably mounted to the body 22 and controlled by the processing system 24, but can alternatively be otherwise mounted to the aerial system 12 and/or controlled. The aerial system 12 can include multiple lift mechanisms 34. In one example, the aerial system 12 includes four lift mechanisms 34 (e.g., two pairs of lift mechanisms 34), wherein the lift mechanisms 34 are substantially evenly distributed about the perimeter of the aerial system 12 (e.g., wherein the lift mechanisms 34 of each pair oppose each other across the body 22). However, the lift mechanisms 34 can be otherwise configured.

More particularly, the lift mechanism 34 functions to provide lift of the aerial device, and typically includes a set of rotors driven (individually or collectively) by one or more motors. Each rotor rotates about a corresponding rotor axis, defines a corresponding rotor plane normal to the rotor axis, and sweeps out a swept area on the rotor plane. The motors typically provide sufficient power to the rotors to enable aerial system flight, and may operate in two or more modes. At least one of the modes provides sufficient power for flight, and at least one of the modes provides less power than required for flight (e.g., providing zero power, providing 10% of a minimum flight power, etc.). The power provided by the motors affects the angular velocities at which the rotors rotate about their respective rotor axes. During aerial system flight, the set of rotors cooperatively or individually generate (e.g., by rotating about their rotor axes) substantially all (e.g., more than 99%, more than 95%, more than 90%, more than 75%) of the total aerodynamic force generated by the aerial device (possibly excluding a drag force generated by the body such as during flight at high airspeeds). Alternatively or additionally, the aerial device includes any other suitable flight components that function to generate forces for aerial system flight, such as jet engines, rocket engines, wings, solar sails, and/or any other suitable force-generating components.

In various embodiments, the aerial device has 1, 2, 3, 4, 5, 6, 7, 8, 9, or 10 rotors, placed as determined by one of skill in the art. The rotors may be substantially evenly dispersed about the aerial system body, and each rotor plane may be substantially parallel (e.g., within 10 degrees) to a lateral plane of the aerial system body 22 (e.g., encompassing the longitudinal and lateral axes). The rotors typically occupy a relatively large portion of the entire aerial device (e.g., 90%, 80%, 75%, or majority of the aerial system footprint, or any other suitable proportion of the aerial device). For example, the sum of the square of the diameter of each rotor can be greater than a threshold amount (e.g., 10%, 50%, 75%, 90%, 110%, etc.) of the convex hull of the projection of the aerial device onto a primary plane of the system (e.g., the lateral plane). However, the rotors can be otherwise arranged.

Additional sensors 36 of the aerial system 12 function to record signals indicative of aerial system operation, the ambient environment surrounding the aerial system 12 (e.g., the physical space proximal the aerial system 12), or any other suitable parameter. The sensors 36 are preferably mounted to the body 22 and controlled by the processing system 24, but can alternatively be mounted to any other suitable component and/or otherwise controlled. The aerial system 12 can include one or more sensors 30, 36. Examples of sensors that can be used include: additional cameras (e.g., CCD, CMOS, multispectral, visual range, hyperspectral, stereoscopic, etc.), orientation sensors (e.g., inertial measurement sensors, accelerometer, gyroscope, altimeter, magnetometer, etc.), ambient light sensors, temperature sensors, pressure sensors, optical sensors, acoustic sensors (e.g., transducers, microphones), audio sensors (e.g., transducer, microphone, etc.), barometers, voltage sensors, current sensors (e.g., Hall effect sensors), air flow meter, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor.

In one variation, the aerial system 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number and arrangement of any sensor type.

The aerial system 12 can additionally include inputs (e.g., microphones, cameras, etc.), outputs (e.g., displays, speakers, light emitting elements, etc.), or any other suitable component.

The aerial system 12 can optionally be used with a remote computing system, or with any other suitable system. The aerial system 12 functions to fly, and can additionally function to take photographs, deliver loads, and/or relay wireless communications. The aerial system 12 is preferably a rotorcraft (e.g., hopter, quadcopter, helicopter, cyclocopter, etc.), but can alternatively be a fixed-wing aircraft, aerostat, or be any other suitable aerial system 12.

The remote computing system may be a remote device 16 that functions to receive auxiliary user inputs, and can additionally function to automatically generate control instructions for and send the control instructions to one or more aerial systems 12. Each aerial system 12 can be controlled by one or more remote computing systems (e.g., one or more remote devices 16). The remote computing system preferably controls the aerial system 12 through a client (e.g., a native application, browser application, etc.), but can otherwise control the aerial system 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The system 10 may be configured for controller-free user drone interaction. Normally, the aerial system, or drone, 12 requires a separate device, e.g., the remote device 16. The remote device 16 may be embodied in different types of devices, including, but not limited to a ground station, remote control, or mobile phone, etc. In some embodiments, control of the aerial system 12 may be accomplished by the user through user expression without utilization of the remote device 16. User expression may include, but is not limited to, any action performed by the user that do not include physical interaction with the remote device 16, including thought (through brain wave measurement), facial expression (including eye movement), gesture and/or voice. In such embodiments, user instructions are received directly via the optical sensors 30 and at least some of the other sensors 36 and processed by the onboard processing system 24 to control the aerial system 12.

In at least one embodiment, the aerial system 12 may be controlled without physical interaction with the remote device 16, however, a display of the remote device 16 may be used to display images and/or video relayed from the aerial system 12 which may aid the user 20 in controlling the aerial system 12. In addition, sensors 30, 36 associated with the remote device 16, e.g., camera(s) and/or a microphone (not show) may relay data to the aerial system 12, e.g., when the aerial system 12 is too far away from the user 20. The sensor data relayed from the remote device 16 to the aerial system 12 is used in the same manner as the sensor data from the on-board sensors 30, 36 are used to control the aerial system 12 using user expression.

In this manner, the aerial system 12 may be fully controlled, from start to finish, either (1) without utilization of a remote device 16, or (2) without physical interaction with the remote device 16. Control of the aerial system 12 based on user instructions received at various on-board sensors 30, 36. It should be noted that in the following discussion, utilization of on-board sensors 30, 36 may also include utilization of corresponding or similar sensors on the remote device 16.

In general, the user 20 may utilize certain gestures and/or voice control to control take-off, landing, motion of the aerial system 12 during flight and other features, such as triggering of photo and/or video capturing. As discussed above, the aerial system 12 may provide the following features without utilization of, or processing by, a remote device 16:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial system 12 includes an optical system 28 that includes one or more optical sensor 30, such as a camera. The at least one on-board camera is configured for live video streaming and computer vision analysis. Optionally the aerial system 12 can have at least one depth sensor (or stereo-vision pair) for multi-pixel depth sensing. Optionally the aerial system 12 can have at least one microphone on board for voice recognition and control.

In general, in order to provide full control of the aerial system 12, a plurality of user/drone interactions or activities from start to end of an aerial session are provided. The user/drone interactions, include, but are not limited to take-off and landing, owner recognition gesture recognition, facial expression recognition, and voice control.

In one embodiment, the aerial device may be a drone or unmanned aircraft. In one embodiment, the aerial device is a rotorcraft, such as a quadcopter, helicopter, cyclocopter, and the like. In alternative embodiments, the aerial device may be a fixed-wing aircraft, an aerostat, or any other suitable aircraft. The aerial device is generally configured to fly within a physical space and, in certain embodiments, the aerial device is further designed to capture images (such as photographs and/or video), and stream the images in near-real time to a remote device. In another embodiment, the aerial device is designed to capture and stream audio to a remote device. The aerial device may be designed to perform a variety of other functions, such as surveillance for industry, for monitoring weather conditions, for border patrols, for military operations, etc.

Two-Axis Gimbal System 14

Referring to FIGS. 3-11, in the illustrated embodiment, the aerial system 12 and the two-axis gimbal system 14 for use in supporting a camera 44 for the body 22 of the aerial system 12. The two-axis gimbal system 14 includes a camera module 46 and a support assembly 48. The camera module 46 typically includes a camera housing 50, a camera communication cable 52, a camera board 54, camera electronics, connector devices, and fixing frames 56. The support assembly 48 includes a pitch assembly 58 and a roll assembly 60.

The two-axis gimbal system 14 functions to actionably mount the camera module 46 to the body 22. The two-axis gimbal system 14 may function to dampen vibration (e.g., mechanically stabilize the resultant image), accommodate for aerial system roll, or perform any other suitable functionality. The two-axis gimbal system 14 may be active (e.g., controlled by the processing system), passive (e.g., controlled by a set of weights, spring elements, magnetic elements, etc.), or otherwise controlled. The two-axis gimbal system 14 may rotate the camera module 46 about one or more axes relative to the body 22, translate the camera module 46 along one or more axes relative to the body 22, or otherwise actuate the camera module 46.

The camera module 46 may include one or more individual cameras 44. The cameras 44 may include a single lens camera (e.g., CCD camera, CMOS camera, etc.), a stereo-camera, a hyperspectral camera, a multispectral camera, or any other suitable imaging or optical sensor. The camera housing 50 includes a base 62 and a cover 64. The base 62 is coupled to the cover 64 via a plurality of screws 66 or any other suitable attachment mechanism. The camera housing 50 may define one or more active surfaces that receive light, but can alternatively include any other suitable component. The active surface may be on the base 62 of the camera housing 50. For example, an active surface of a camera 44 can be an active surface of a camera sensor (e.g., CCD sensor, CMOS sensor, etc.), typically including a regular array of sensor pixels. The camera sensor or other active surface may be substantially planar and rectangular (e.g., having a first sensor edge, a second sensor edge opposing the first sensor edge, and third and fourth sensor edges each perpendicular to and extending from the first sensor edge to the second sensor edge). Alternatively, the camera sensor can have any suitable shape and/or topography. The camera 44 can produce an image frame, which typically corresponds with the shape of the active surface (e.g., rectangular, having a first and second frame edge opposing each other, etc.). The image frame also defines a regular array of pixel locations, with each pixel location corresponding to a sensor pixel of the active surface and/or pixels of the images sampled by the camera 44. Alternatively, the image frame can have any suitable shape. The image frame may also define aspects of the images sampled by the camera 44 (e.g., image dimensions, resolution, pixel size and/or shape, etc.). In addition, the camera 44 may include a zoom lens, digital zoom, fisheye lens, filter, or any other suitable active or passive optical adjustment. Application of the optical adjustment can be actively controlled by the remote device 16, by another controller, or manually by an operator (e.g., where the operator manually sets the adjustment). In an embodiment, the camera housing 50 encloses at least some of the optical system components.

Figure 6:
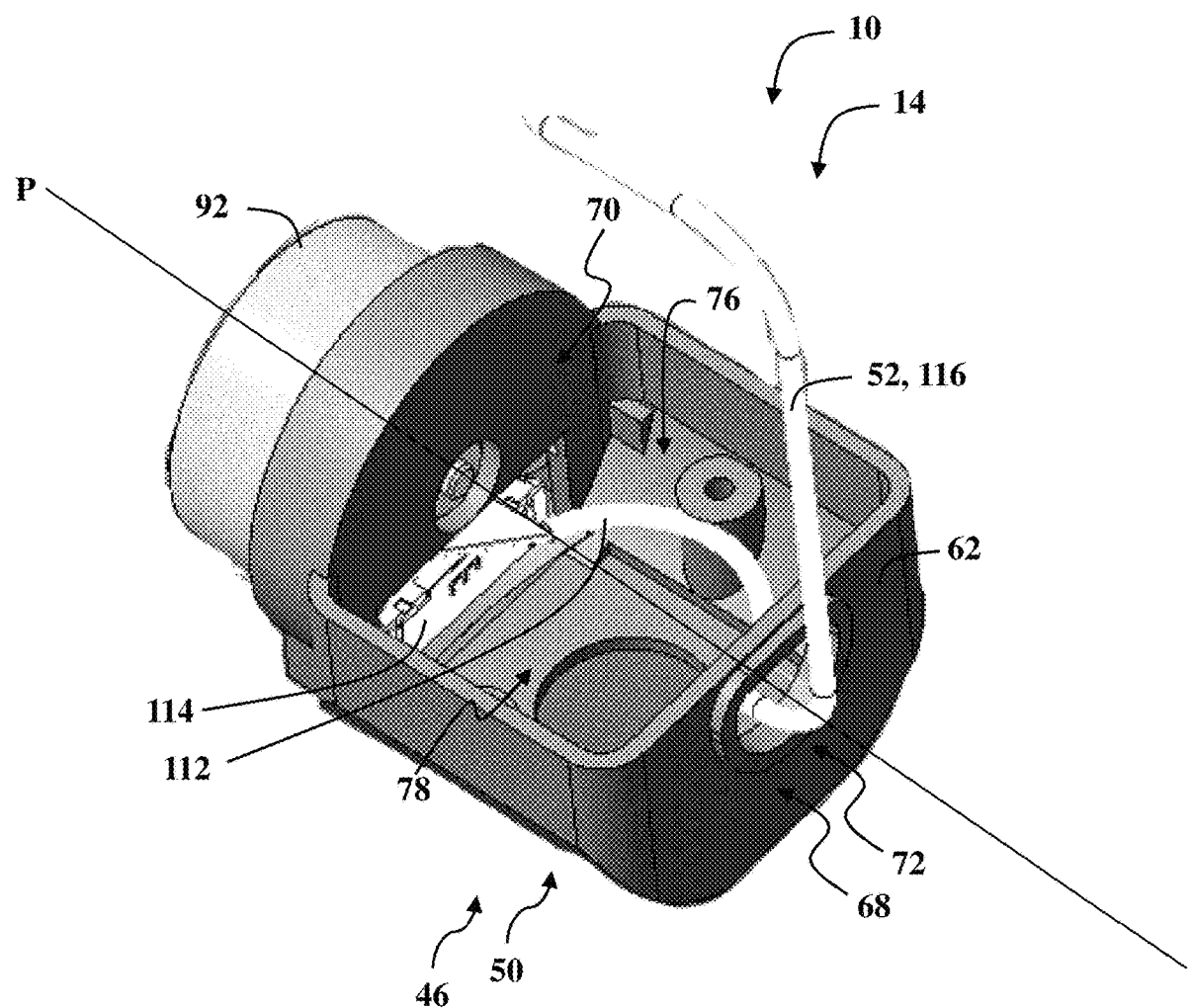
FIG. 6 is a perspective view of a portion of a camera module that may be used with the two-axis gimbal system shown in FIG. 3, according to an embodiment of the present invention.

In one embodiment, the camera housing 50 extends between a first endwall 68 and an opposite second endwall 70 along a pitch axis P, as shown in FIG. 6. The first endwall 68 includes at least one opening 72 extending therethrough. The opening 72 may be placed anywhere along the first endwall 68. In one embodiment, the opening 72 is configured to receive the camera communication cable 52 therethrough. The camera communication cable 52 is coupled to the control board assembly 38 via the connector device 42. In addition, the camera communication cable 52 is coupled to the camera module 46 via a second connector device 74. The camera housing 50 includes an inner surface 76 that defines a positioning cavity 78. The positioning cavity 78 is configured to receive the camera 44 therein. The inner surface 76 may be coupled to the camera 44 so that the camera and the inner surface 76 do not have any space between. In another embodiment, the inner surface 76 and the camera 44 are spaced a distance apart.

In one embodiment, the camera communication cable 52 may be an intermediate flexible cable 80, wherein one end of the intermediate flexible cable 80 is coupled to the camera module 46 via the electrical connector device 74 and the opposite end is coupled to the control board assembly 38 via the second connector device 42. The intermediate flexible cable 80 is typically a coaxial cable 82 which is drawn from an end of the camera module 46 that is not connected with the pitch assembly 58.

The pitch assembly 58 is coupled to the camera housing 50 for rotating the camera housing 50 about the pitch axis P. The pitch assembly 58 drives the camera module 48 to pivot around the pitch axis P. The pitch assembly 58 includes a pitch motor 84 and a pitch support member 86. The pitch motor 84 is coupled to the pitch support member 86. The pitch support member 86 includes a base 88, a first arm 90, and a second arm 92. The second arm 92 is opposite the first arm 90 along the pitch axis P. The first arm 90 and the second arm 92 extend outwardly from the base 88. The first arm 90 and the second arm 92 are coupled to the base 88. For example, but not limited to, the first arm 90 and the second arm 92 are coupled to the base using a plurality of screws. The first arm 90 is configured to support the camera communication cable 52. The second arm 92 is coupled to the second endwall 70 of the camera housing 50.

Figure 4:
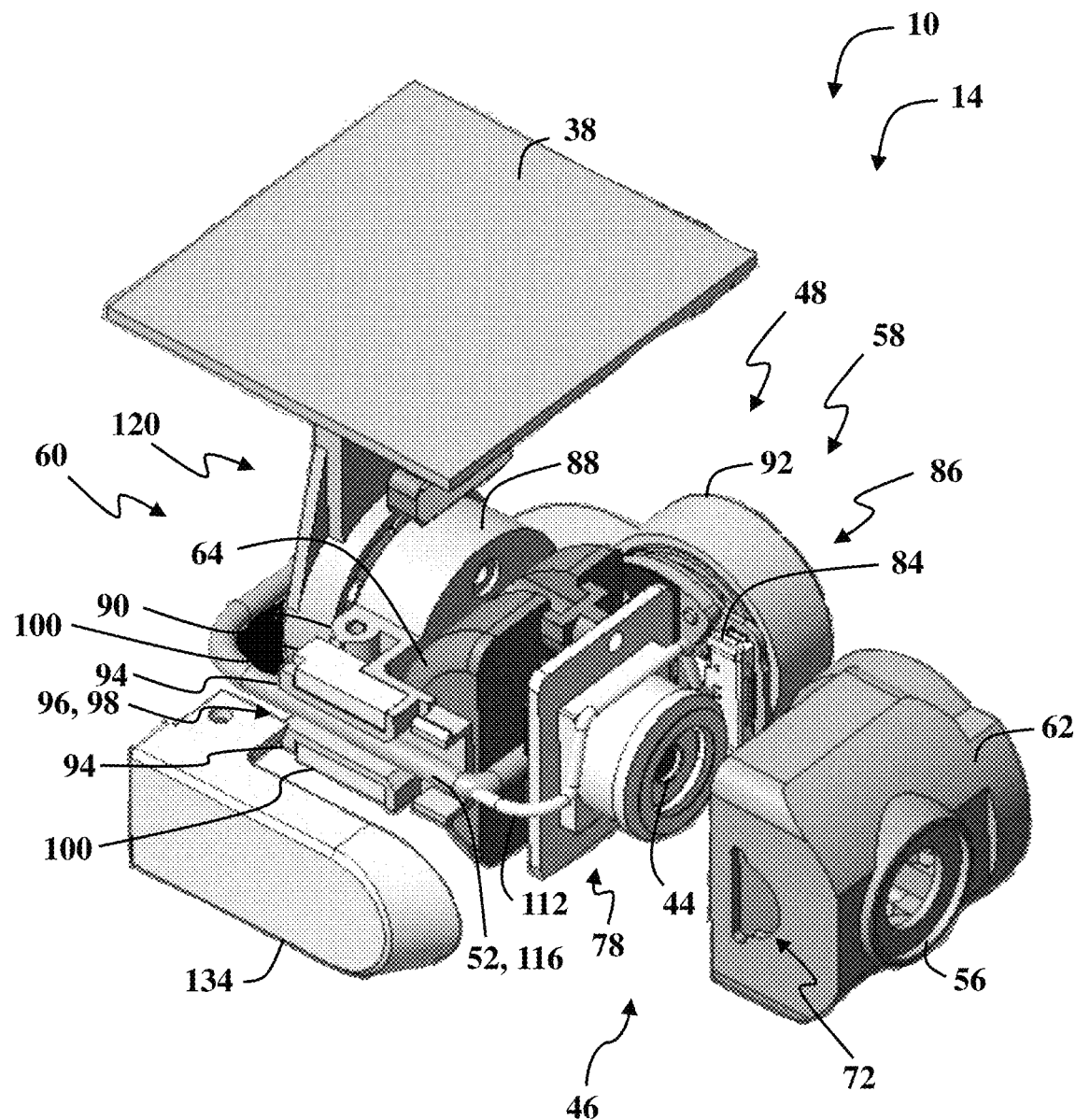
FIG. 4 is another exploded perspective view of the two-axis gimbal system shown in FIG. 3.
Figure 5:
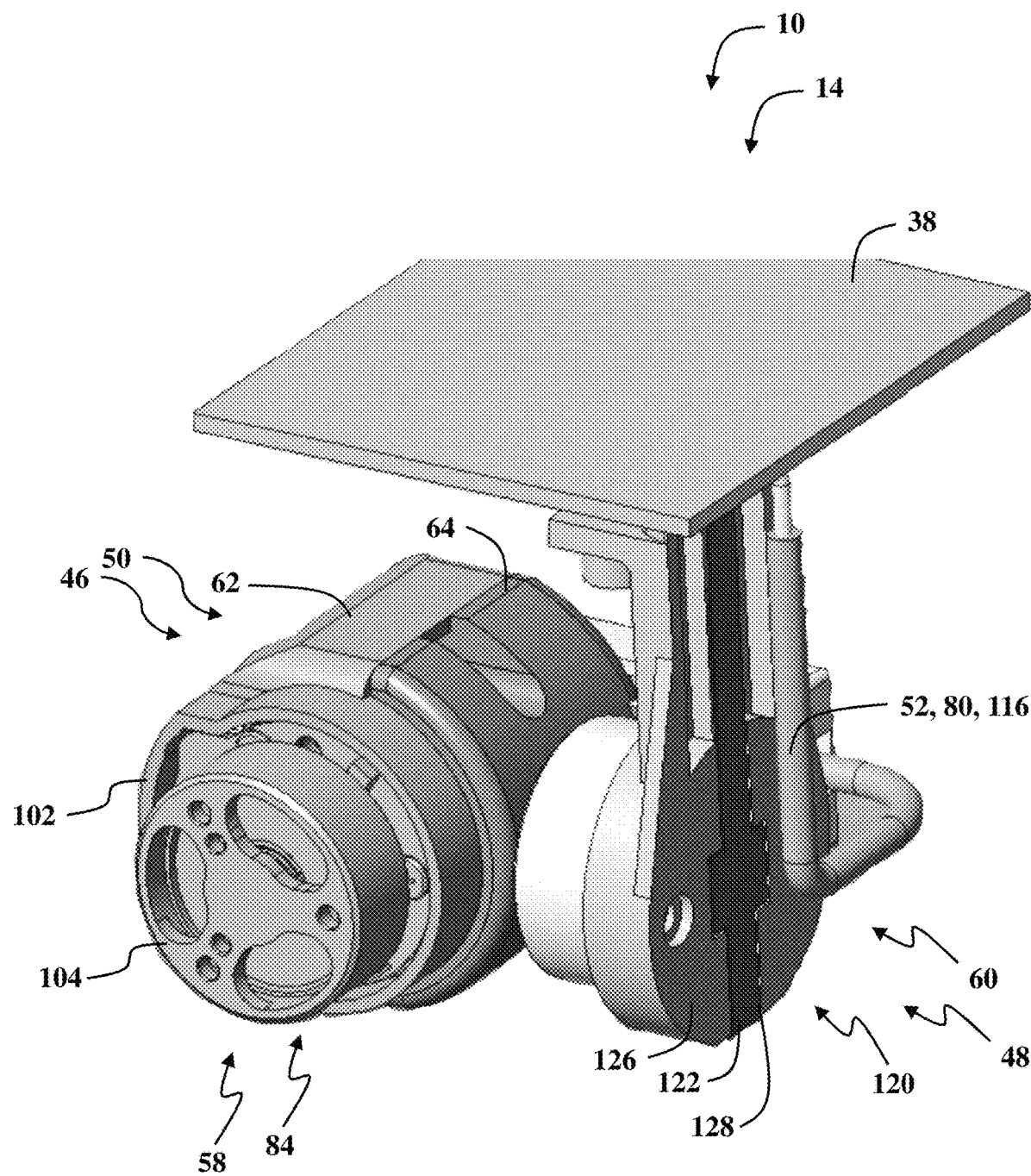
FIG. 5 is a perspective view of a portion of the two-axis gimbal system shown in FIG. 3.

In one embodiment, as shown in FIG. 4, the first arm 90 includes a pair of flanges 94 spaced a distance apart to define a gap 96. The gap 96 defines a channel 98 where the channel 98 is configured to support the camera communication cable 52. In another embodiment, the intermediate flexible cable 80 is typically bent and passed through the channel 98 reserved on the first arm 90, and then is typically bent again turning to the back of the roll assembly 60, and then typically extends upward to the control board assembly 38. The pair of flanges may support at least one counterweight 100. As shown in FIG. 4, by adjusting the weight and position of one or more counterweights 100 on the first arm 90, or by directly adjusting the arrangement of the components without any additional counterweight 100, the load center of gravity of the camera module 46 can be shifted away from the roll axis R. By adjusting the distance of center of gravity of the load portion to the roll axis R, the torque generated by the center of gravity relative to the roll axis R can counteract the torque generated by the bending of the camera communication cable 52 of the camera module 46 and the pitch communication cable 112 of the pitch assembly 58. As a result, the power consumption of the roll assembly 60 can be reduced as the camera angle is at or near a normal or default position.

Figure 9:
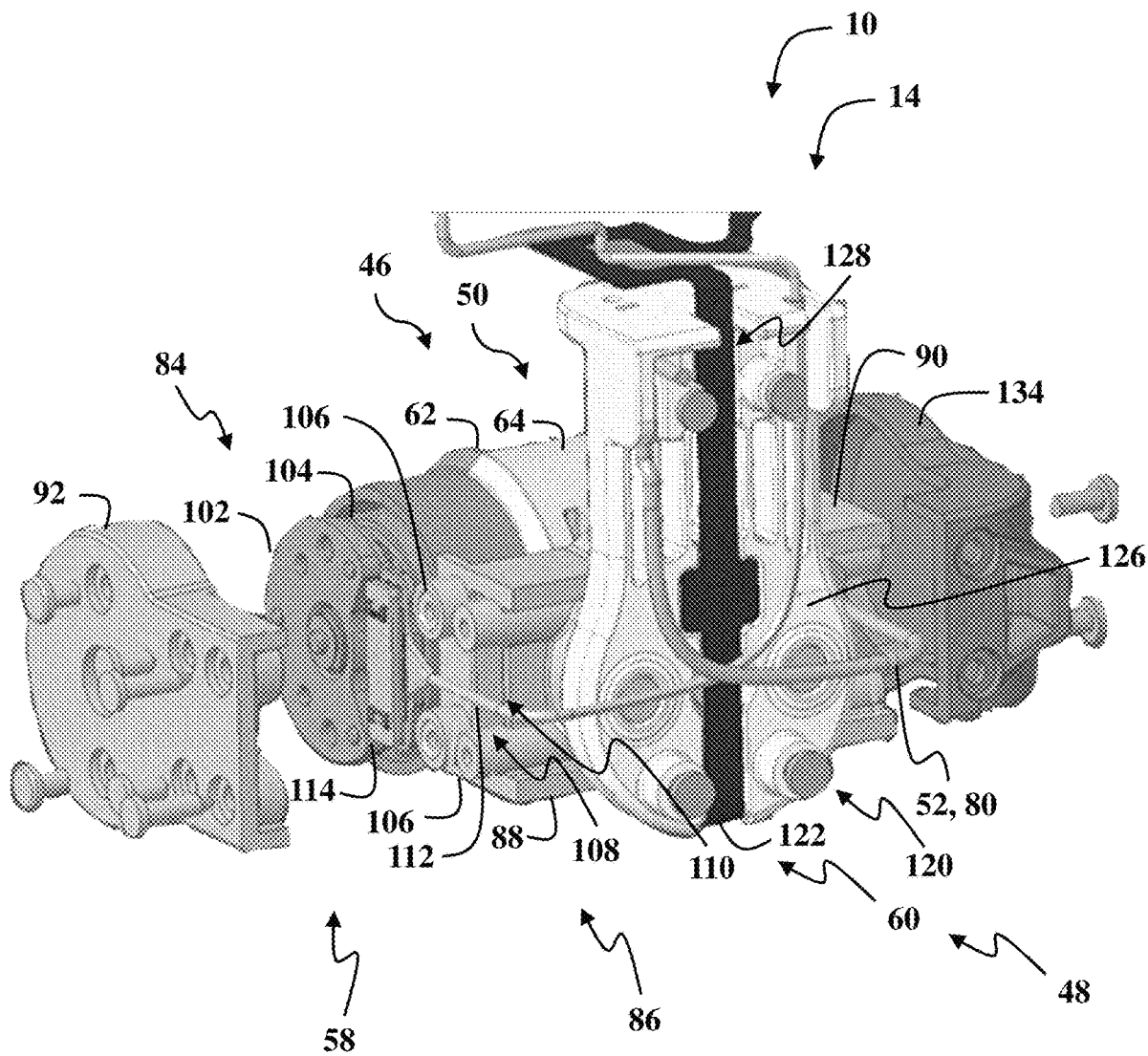
FIG. 9 is an exploded perspective view of the two-axis gimbal system, according to an embodiment of the present invention.
Figure 10:
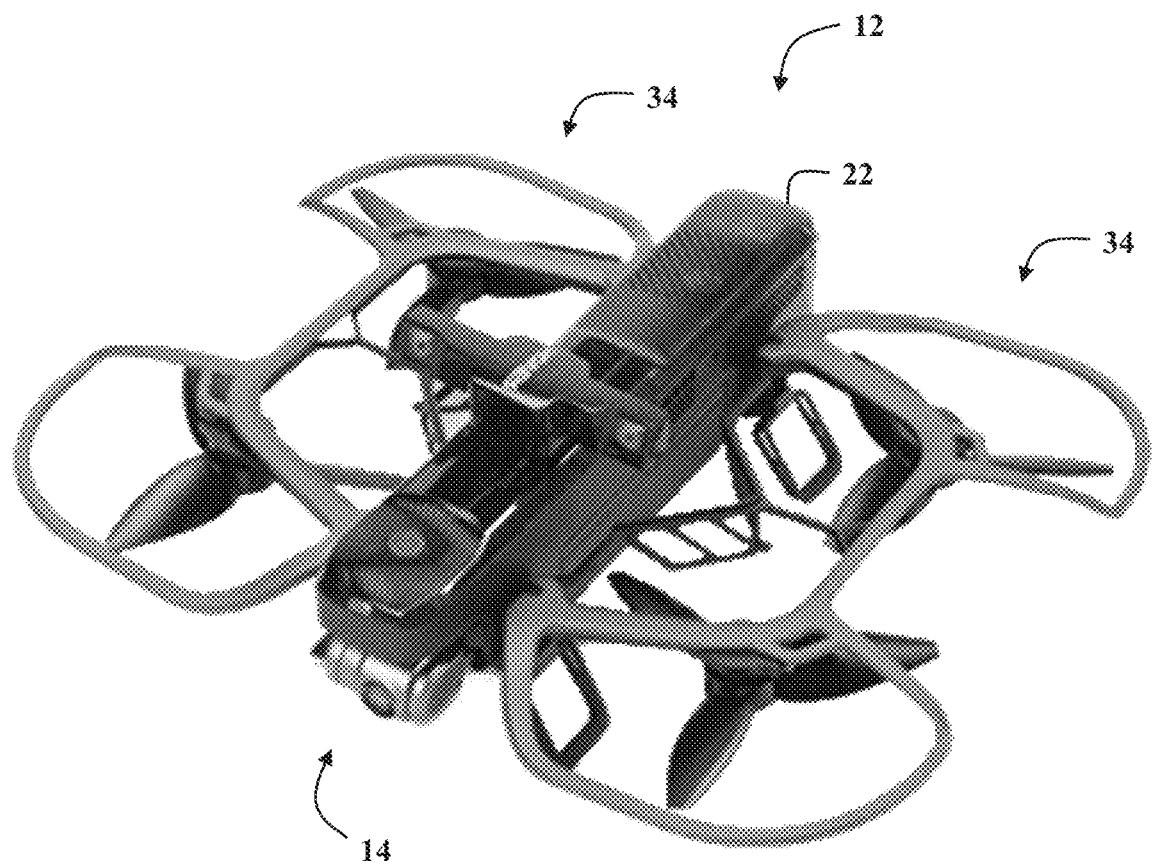
FIG. 10 is a perspective view of the aerial system and the two-axis gimbal system, according to an embodiment of the present invention.
Figure 11:
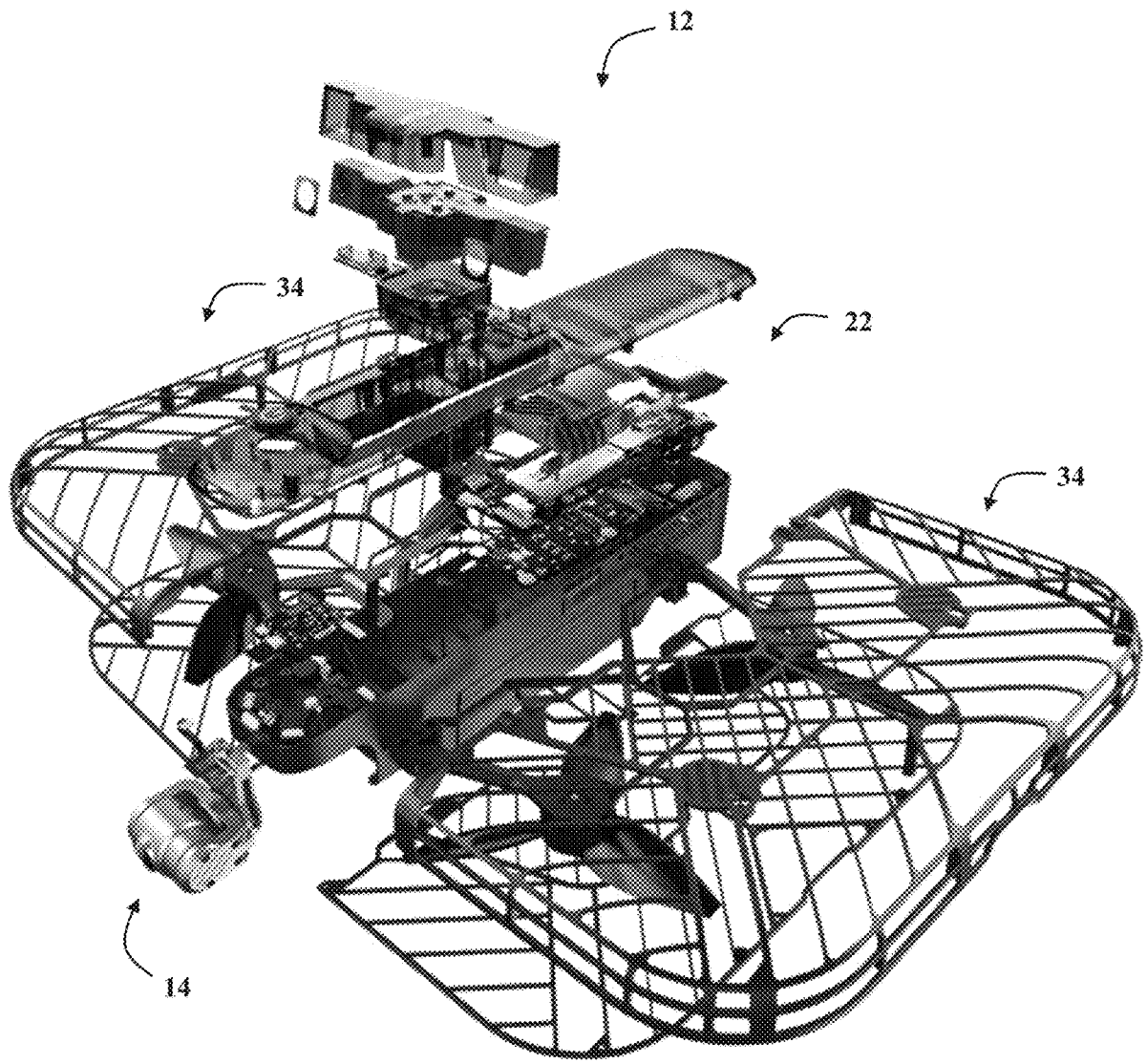
FIG. 11 is an exploded perspective view of the aerial system and the two-axis gimbal system, according to an embodiment of the present invention.

As shown in FIG. 9, the pitch motor 84 includes a pitch stator 102 and a pitch rotor 104. In one embodiment, one end of the pitch stator 102 is coupled to the pitch rotor 104 along the pitch axis P. An opposite end of the pitch stator 102 is coupled to the second arm 92 of the pitch support member 86 along the pitch axis P. One end of the pitch rotor 104 is coupled to the second endwall 70 of the camera housing 50 along the pitch axis P.

As shown in FIG. 9, the base 88 includes a set of supporting members 106 spaced a second distance apart to define a second gap 108. The second gap 108 defines a second channel 110 where the second channel 110 is configured to support a pitch communication cable 112. The pitch communication cable 112 is coupled to the pitch motor 84 via a connector device 114. The pitch communication cable 112 is coupled to the control board assembly 38 via the connector device 42. The pitch assembly 58 includes electrical devices and connections as chosen by one of skill in the art.

Figure 3:
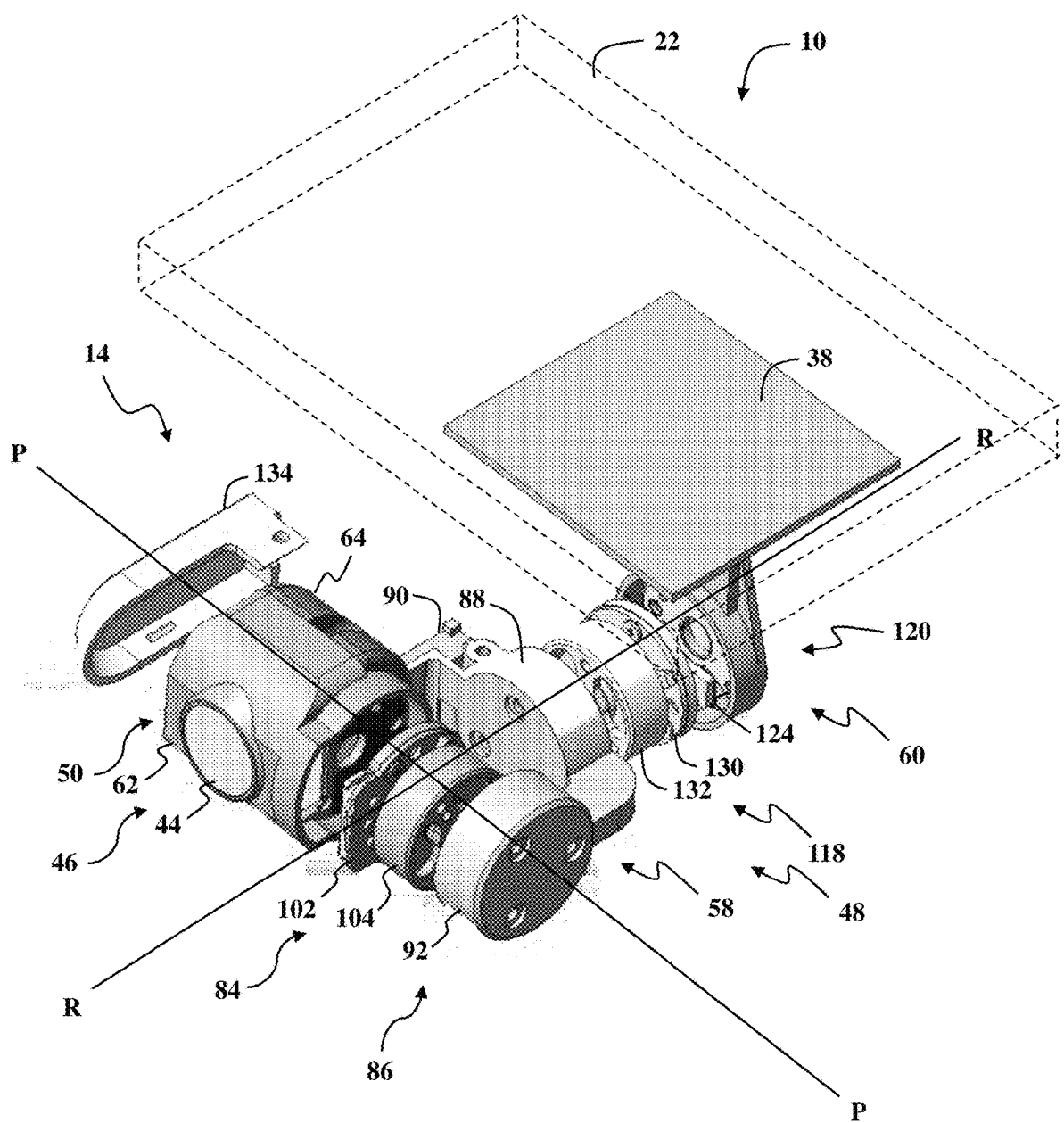
FIG. 3 is an exploded perspective view of a two-axis gimbal system that may be used with the aerial system shown in FIG. 1, according to an embodiment of the present invention.

In another embodiment, as shown in FIG. 3, one end of the pitch stator 102 is coupled to the pitch rotor 104 along the pitch axis P. The opposite end of the pitch stator is coupled to the second endwall 70 of the camera housing 50 along the pitch axis P. In addition, one end of the pitch rotor 104 is coupled to the second arm 92 of the pitch support member 86 along the pitch axis P. The channel 98 is configured to support the pitch communication cable 112. In one embodiment, the pitch communication cable 112 and the camera communication cable 52 are a coaxial cable 116. The channel 98 is configured to support the coaxial cable 116. The pitch communication cable 112 may be an intermediate flexible cable 80 similar to the camera communication cable 52. The intermediate flexible cable is typically a coaxial cable, which shares one channel 98 with the camera communication cable 52. First, the pitch communication cable 112 typically enters the opening 72 of the camera housing 50 from one end and then emerges from the other end to couple to the pitch assembly 58. Then the pitch communication cable 112 is typically bent, passing through the channel 98 reserved on the first arm 90. Then the pitch communication cable 112 is typically bent again turning to the outer surface of the roll assembly 60 and typically extends upward to the control board assembly 38.

As shown in FIG. 3, the roll assembly 60 is coupled to the body 22 and the pitch assembly 58. The roll assembly 60 is configured to rotate the pitch assembly 58 about a roll axis R. The roll axis R is perpendicular to the pitch axis P. The roll assembly 60 includes a roll motor 118 and a roll support member 120.

One end of the roll motor 118 is coupled to one end of the roll support member 120. An opposite end of the roll motor 118 is coupled to the control board assembly 38 with a flexible printed circuit 122. The roll support member 120 includes an inner surface 124, an outer surface 126, and a recessed portion 128. The recessed portion 128 is defined along the outer surface 126 of the roll support member 120. The recessed portion 128 is configured to receive the flexible printed circuit 122. In one embodiment, the roll motor 118 includes a roll stator 130 and a roll rotor 132. One end of the roll stator 130 is coupled to one end of the roll rotor 132 along the roll axis R. In addition, an opposite end of the roll stator 130 is coupled to the inner surface 124 of the roll support member 120 along the roll axis R. The opposite end of the roll rotor 132 is coupled to the pitch support member 86 along the roll axis R. The roll assembly 60 includes electrical devices and connections as chosen by one of skill in the art.

One or both of these motor assemblies 56, 58 can be any suitable pitch axis motor assembly 56 or roll axis motor assembly 58 known in the art, respectively. For example, one or both motor assemblies 56, 58 may be or include an electric motor or any other suitable motor. Non-limiting examples of electric motors that can be used include DC motors (e.g., brushed motors), EC motors (e.g., brushless motors), induction motor, synchronous motor, magnetic motor, or any other suitable electric motor. The motor is preferably electrically connected to and controlled by the processing system 24, and electrically connected to and powered by a power source or supply 38. However, the motor can be otherwise connected. The two-axis gimbal system 14 preferably includes a single motor-support set, but can alternatively include multiple motor-support sets, wherein auxiliary motor-support sets can be arranged orthogonal (or at any other suitable angle to) the first motor-support set.

Figure 8A:
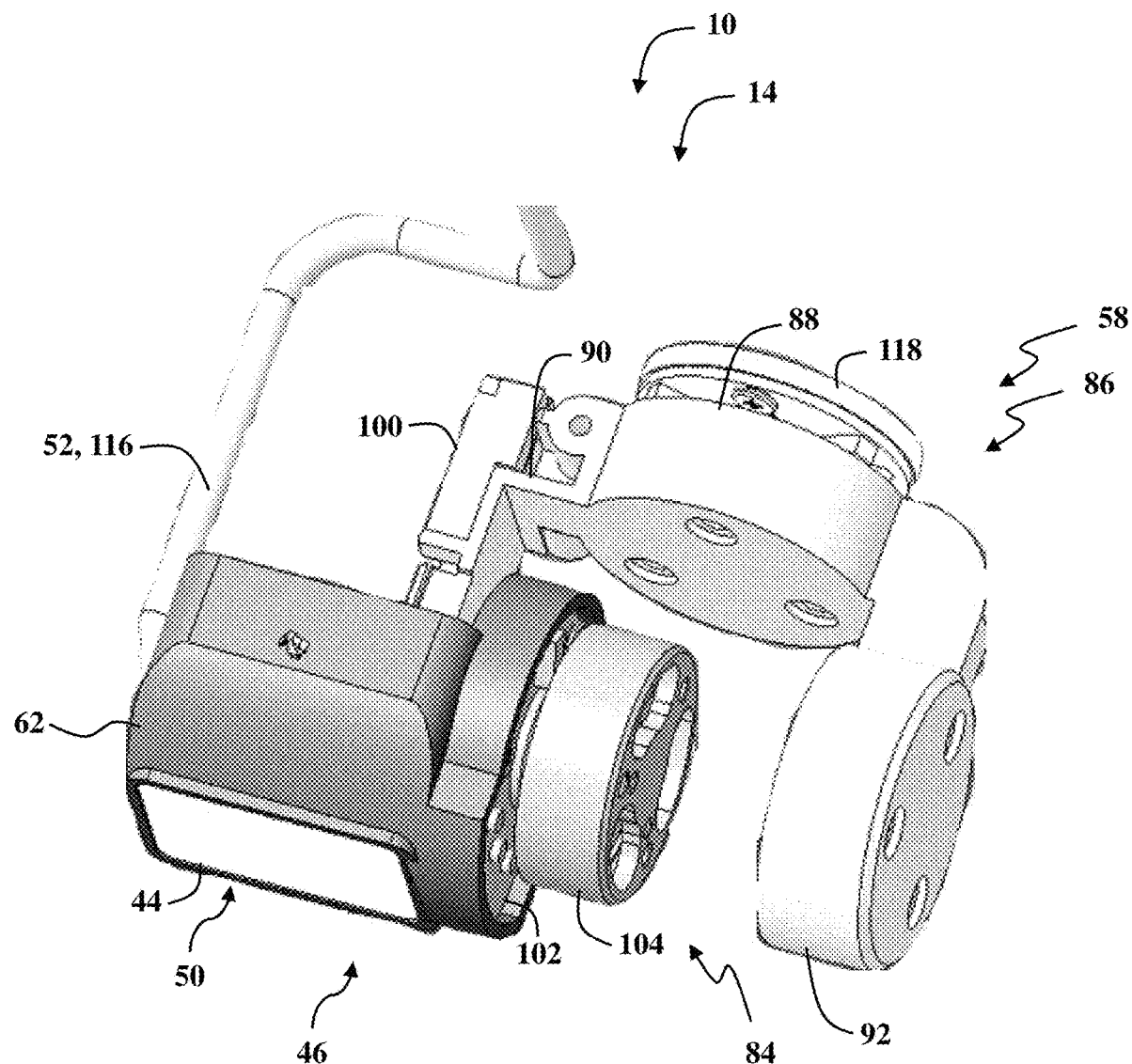
FIGS. 8A-8H are perspective views of portions of the two-axis gimbal system shown in FIG. 3.
Figure 8B:
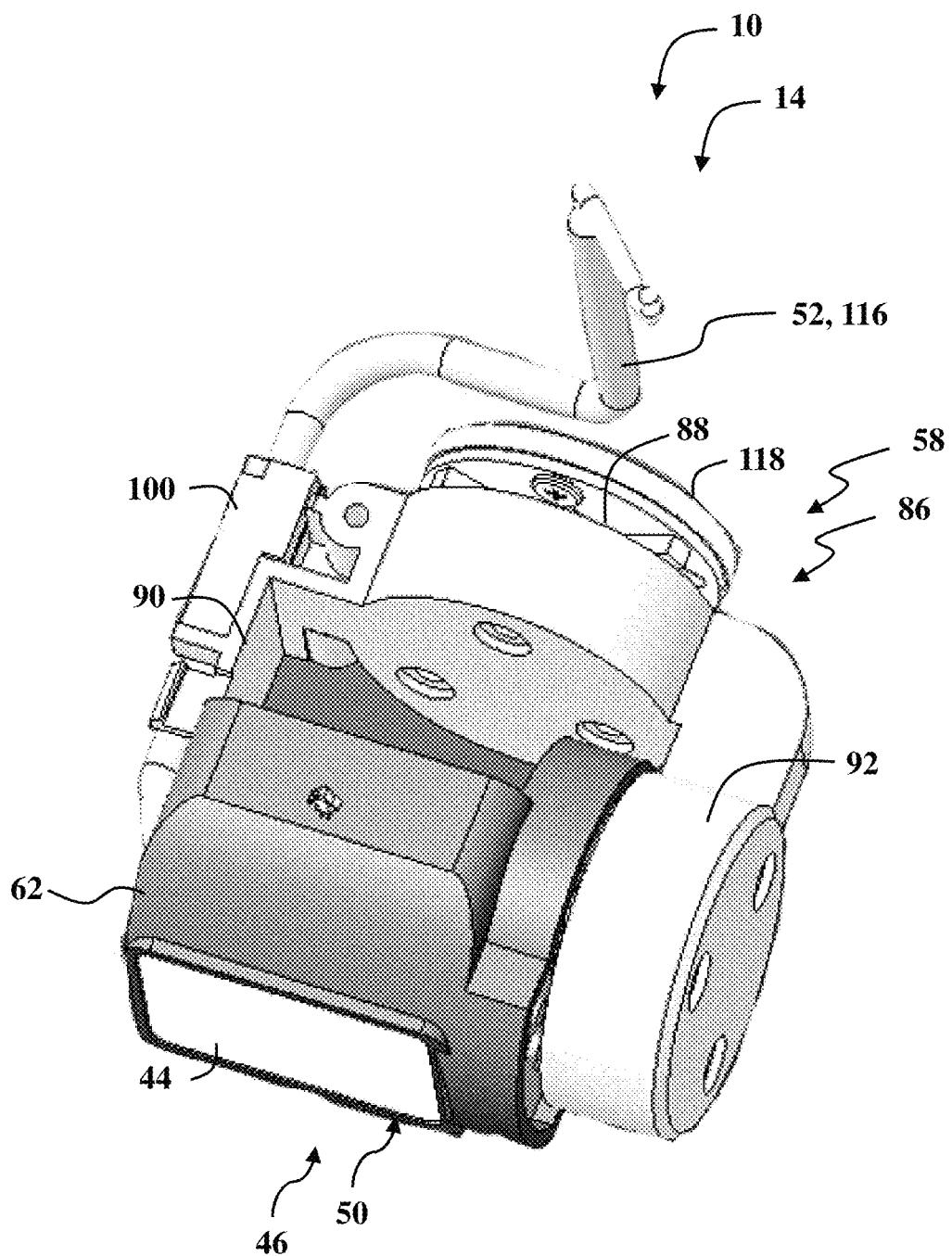
Figure 8C:
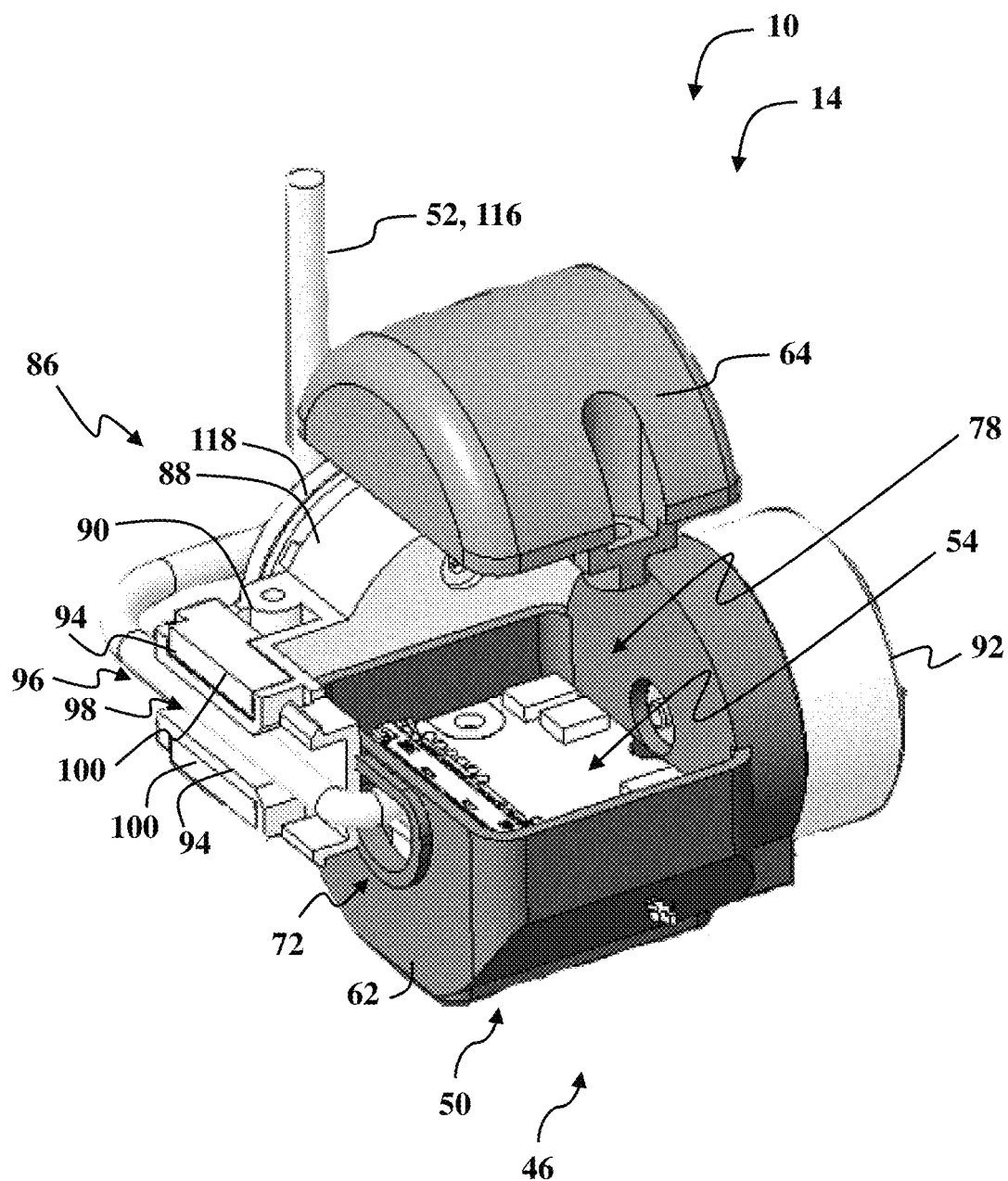
Figure 8D:
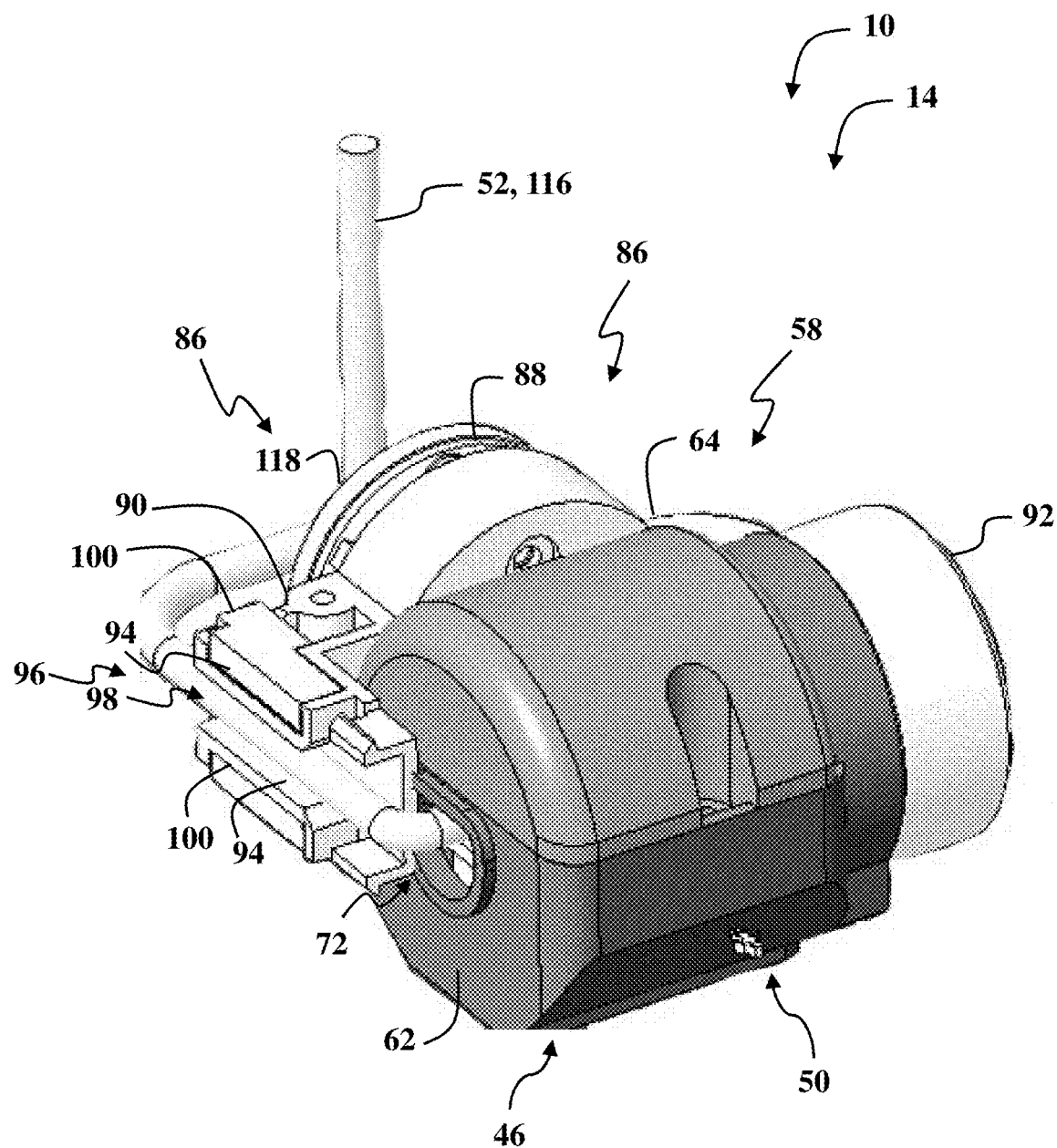
Figure 8E:
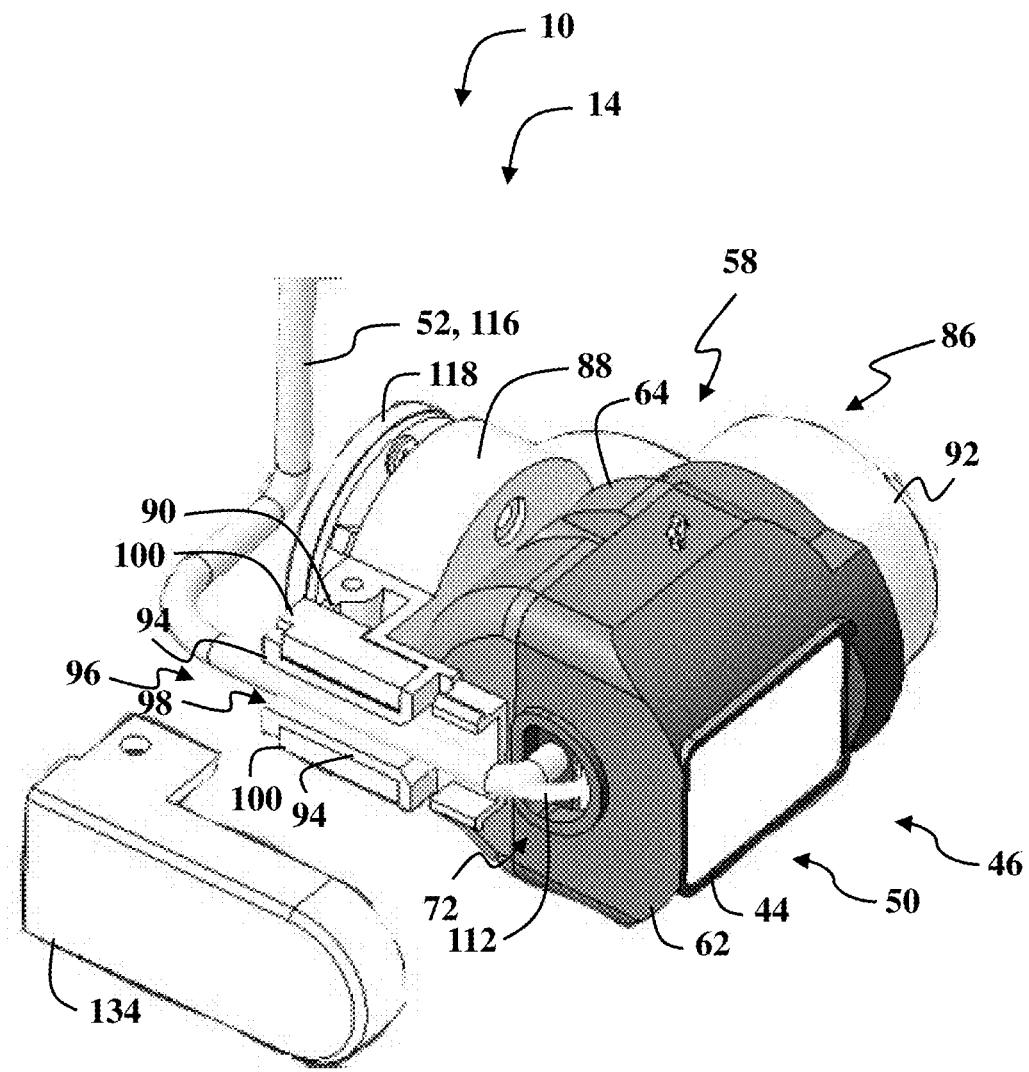
Figure 8F:
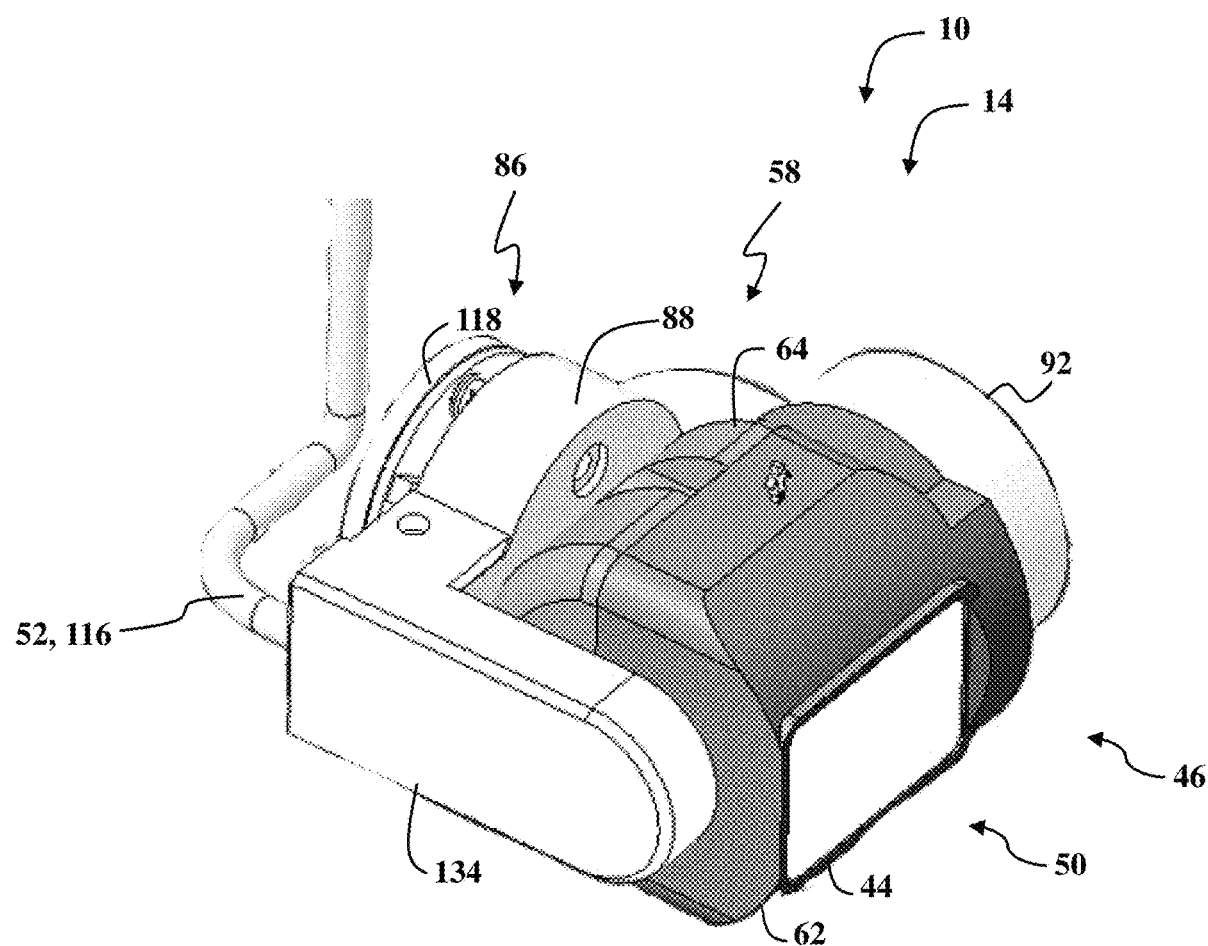
Figure 8G:
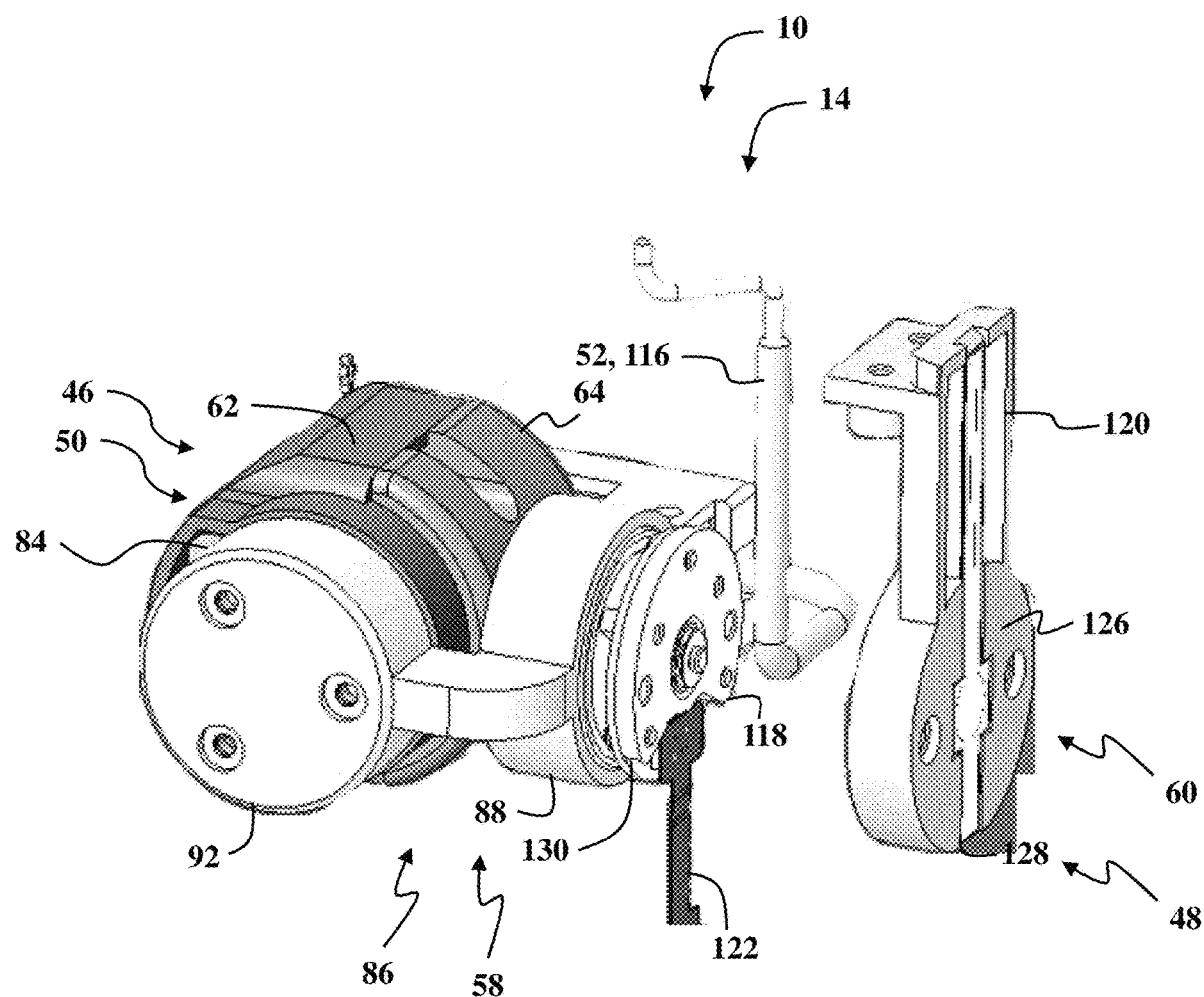
Figure 8H:
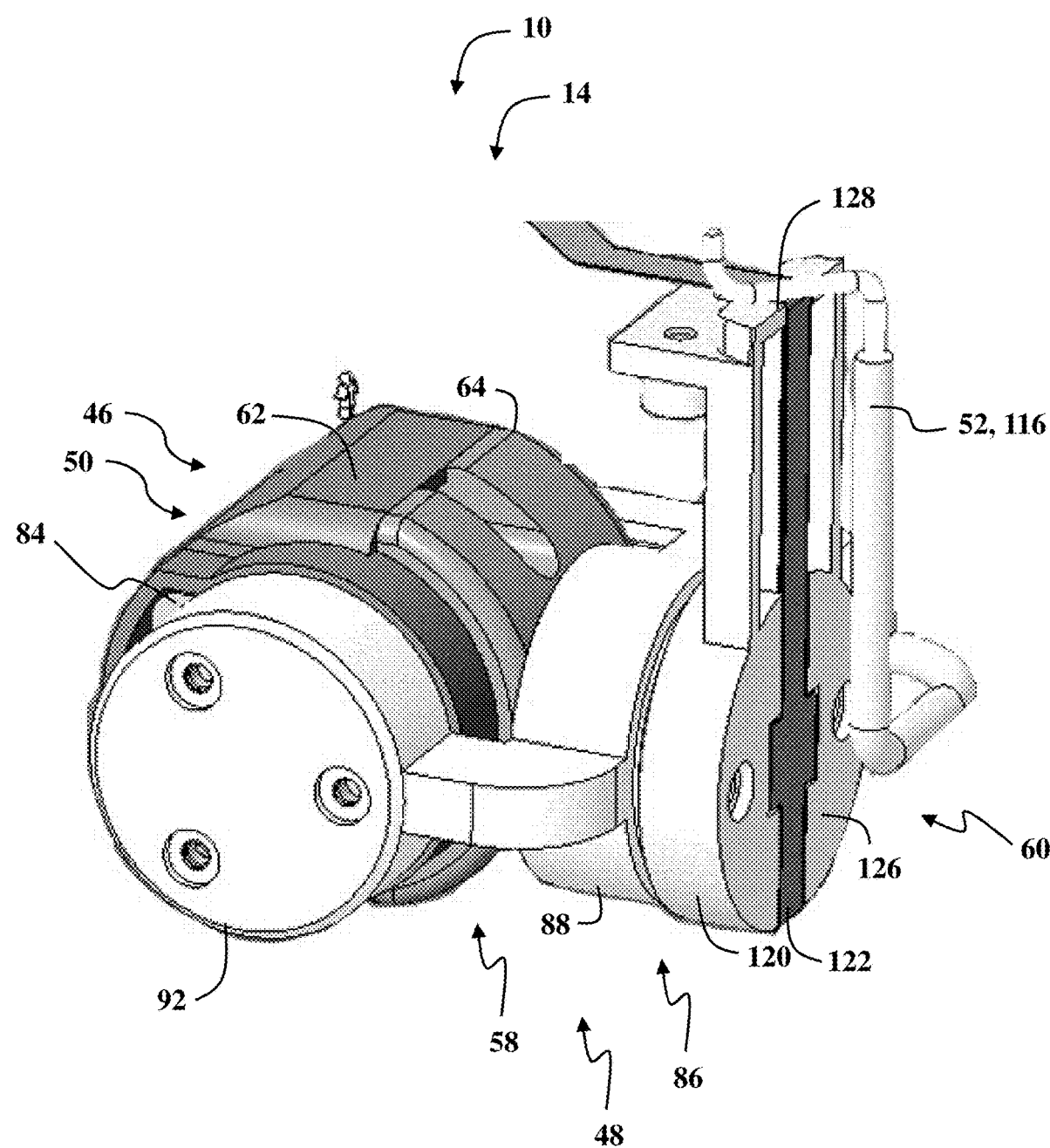

In one embodiment, the two-axis gimbal assembly 14 further includes a cover 134. The cover 134 is rotatably coupled to the pitch assembly 58. The cover 134 is a cable guiding/concealing cover which may cover all or a portion of any one or more components of the system 14. For example, as shown in FIGS. 8E, 8F, and 9, the cover 134 may cover the first arm 90 of the pitch assembly 58 protecting the plurality of cables along the first arm 90. The plurality of cables may include the camera communication cable 52, the pitch communication cable 112, or the coaxial cable 116.

System Assembly Procedure

Figure 7:
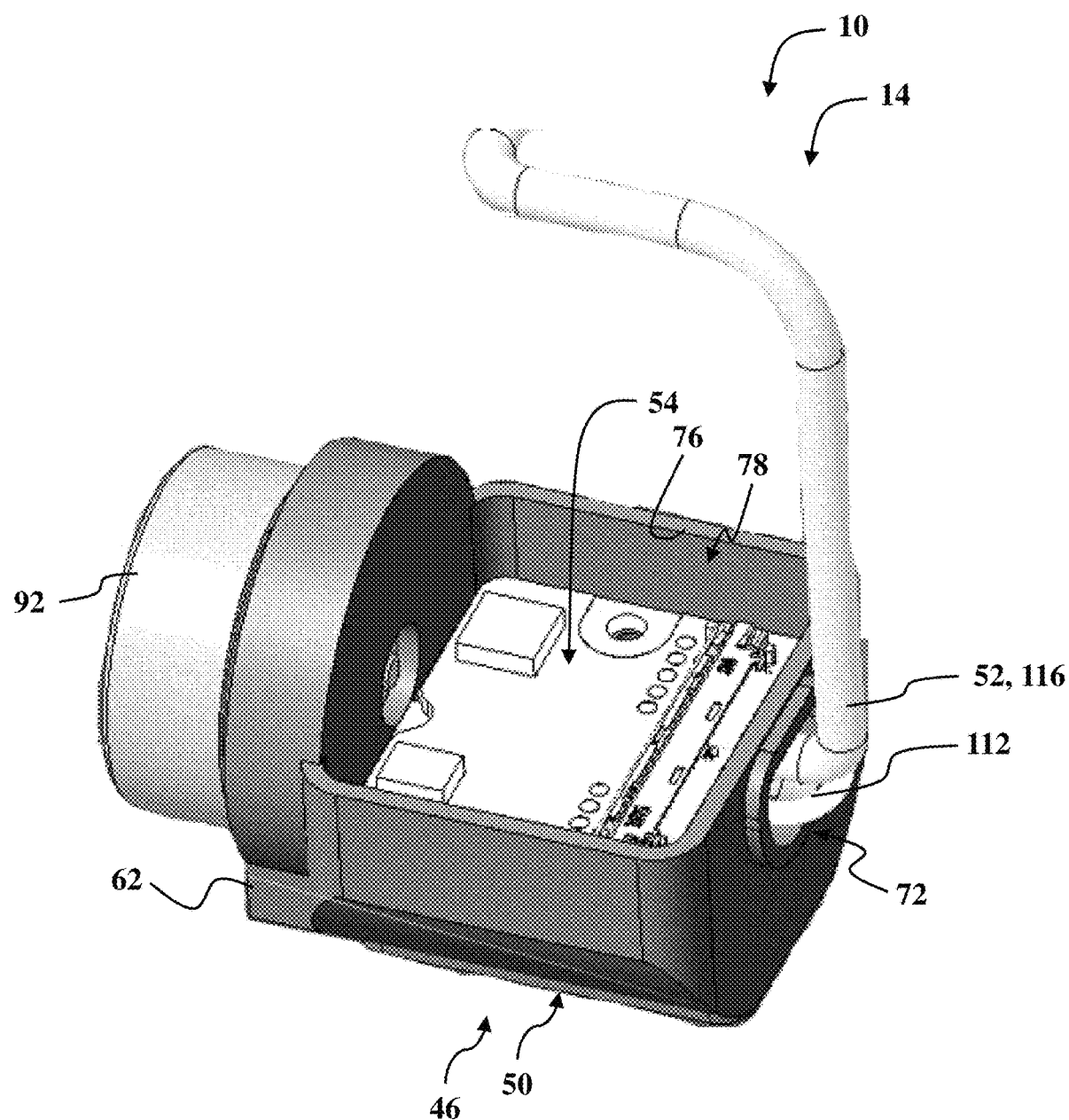
FIG. 7 is another perspective view of the camera module shown in FIG. 6.

This disclosure also provides an assembly procedure for the system 10. In various embodiments, the pitch assembly 58 is mounted to support the camera module 46. The pitch communication cable 112, via the coaxial cable 116, connects the pitch assembly 58 inside the camera module 46, and emerges through the opening 72 on the camera housing 50, e.g., as shown in FIG. 6. A camera board 54 can be affixed by any suitable adhesive. In another embodiment, the camera communication cable 52 emerges through the opening 72 on the side as well, e.g., as shown in FIG. 7. In still another embodiment, the roll assembly 60 is coupled to the pitch assembly 58 along the roll axis R. The counterweight 100 may be fixed on the first arm 90 of the pitch assembly 58. The first arm 90 may be vertically mounted with the camera module 46 from the side, e.g., as shown in FIGS. 8A and 8B. Further, as is shown in FIGS. 8C and 8D the camera module 46 may be rotated 90 degrees followed by fitting of a rear cover and fastening of screws.

Moreover, as shown in FIG. 9, camera housing 50 may then be mounted with buckles and screws at both ends to prevent deformation. Subsequently, after the flexible printed circuit 122 is connected, the roll assembly 60 may be mounted. Then screws can be fastened and the flexible printed circuit 122 can be folded and fixed on the back of the roll assembly 60, via the recessed portion 128 of the roll support member 120 by double-sided tape. In various embodiments, a shifted center of mass/gravity counteracts the residual torque generated by the bending cables. Such design concepts can be further extended to any single axis/multiple axes gimbal systems.

In yet another embodiment, the pitch assembly 58 is mounted to support the camera module 46. The camera communication cable 52 connects the camera to the control board assembly 38. The camera communication cable 52 emerges through the opening 72 on the camera housing 50, as shown in FIG. 8E. The camera board 54 may be affixed by any suitable adhesive. The pitch communication cable 112 connects the pitch assembly 58 to the control board assembly 38 via the second arm 92 of the pitch support member 86. The second channel 110 supports the pitch communication cable 112, as shown in FIG. 9. In still another embodiment, the roll assembly 60 is coupled to the pitch assembly 58 along the roll axis R. The counterweight 100 may be fixed on the first arm 90 of the pitch assembly 58. The first arm 90 may be vertically mounted with the camera module 46 from the side. Further, as is shown in FIGS. 8C and 8D the camera module 46 may be rotated 90 degrees followed by fitting of a rear cover and fastening of screws. Moreover, the camera housing 50 and roll assembly 60 are similar to the embodiment described above. Such design concepts can be further extended to any single axis/multiple axes gimbal systems.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

The invention claimed is:

1. An aerial system, comprising:
a body;
a lift mechanism coupled to the body; and
a two-axis gimbal assembly coupled to the body, the two-axis gimbal assembly comprising:
 a camera housing of a camera module extending between a first endwall and a second endwall along a pitch axis, the first endwall including an opening extending therethrough, the opening is configured to receive a camera communication cable, the camera communication cable coupled to a camera and a control board, the camera housing including an inner surface that defines a positioning cavity, the positioning cavity is configured to receive the camera therein; and
 a support assembly including:
  a pitch assembly coupled to the camera housing for rotating the camera housing about the pitch axis, the pitch assembly including a pitch motor and a pitch support member, the pitch motor coupled to the pitch support member, the pitch support member including a base, a first arm, and a second arm, the second arm is opposite the first arm, the first arm and the second arm extending outwardly from the base, the first arm is configured to support the camera communication cable, the second arm coupled to the second endwall of the camera housing, wherein the first arm includes a pair of flanges spaced a distance apart to define a gap, the gap defines a channel, the channel is configured to support the camera communication cable;
  a roll assembly coupled to the body and the pitch assembly, the roll assembly is configured to rotate the pitch assembly about a roll axis, the roll axis is perpendicular to the pitch axis, the roll assembly including a roll motor and a roll support member, the roll motor coupled to the roll support member, the roll motor coupled to the control board with a flexible printed circuit, the roll support member including an outer surface and a recessed portion defined along the outer surface, the recessed portion is configured to receive the flexible printed circuit; and,
  one or more counterweights supported by one or both of the flanges of the first arm, wherein the number and/or arrangement of the one or more counterweights is selected to adjust the center of gravity of the camera module relative to the roll axis.

2. The aerial system of claim 1, wherein the pitch motor includes: a pitch stator and a pitch rotor, the pitch stator coupled to the pitch rotor along the pitch axis, the pitch stator coupled to the second arm of the pitch support member along the pitch axis, the pitch rotor coupled to the second endwall of the camera housing along the pitch axis.

3. The aerial system of claim 2, wherein the base includes a set of supporting members spaced a second distance apart to define a second gap, the second gap defines a second channel, the second channel is configured to support a pitch communication cable, the pitch communication cable coupled to the pitch motor and the control board.

4. The aerial system of claim 1, wherein the pitch motor includes: a pitch stator and a pitch rotor, the pitch stator coupled to the pitch rotor along the pitch axis, the pitch stator coupled to the second endwall of the camera housing along the pitch axis, the pitch rotor coupled to the second arm of the pitch support member along the pitch axis.

5. The aerial system of claim 4, wherein the channel is configured to support a pitch communication cable, the pitch communication cable coupled to the pitch motor and the control board.

6. The aerial system of claim 5, wherein the pitch communication cable and the camera communication cable are a coaxial cable, the channel is configured to support the coaxial cable.

7. A two-axis gimbal assembly for use with an aerial system, the aerial system including a body and a lift mechanism coupled to the body, the two-axis gimbal assembly comprising:
a control board;
a camera;
a camera housing extending between a first endwall and a second endwall along a pitch axis, the first endwall including an opening extending therethrough, the opening is configured to receive a camera communication cable, the camera communication cable coupled to the camera and the control board, the camera housing including an inner surface that defines a positioning cavity, the positioning cavity is configured to receive the camera therein; and
a support assembly coupled to the body of the aerial system, the support assembly including:
 a pitch assembly coupled to the camera housing for rotating the camera housing about the pitch axis, the pitch assembly including a pitch motor and a pitch support member, the pitch motor coupled to the pitch support member, the pitch support member including a base, a first arm, and a second arm, the second arm is opposite the first arm, the first arm and the second arm extending outwardly from the base, the first arm is configured to support the camera communication cable, the second arm coupled to the second endwall of the camera housing, wherein the first arm includes a pair of flanges spaced a distance apart to define a gap, the gap defines a channel, the channel is configured to support the camera communication cable;
 a roll assembly coupled to the body and the pitch assembly, the roll assembly is configured to rotate the pitch assembly about a roll axis, the roll axis is perpendicular to the pitch axis, the roll assembly including a roll motor and a roll support member, the roll motor coupled to the roll support member, the roll motor coupled to the control board with a flexible printed circuit, the roll support member including an outer surface and a recessed portion defined along the outer surface, the recessed portion is configured to receive the flexible printed circuit; and,
 one or more counterweights supported by one or both of the flanges of the first arm, wherein the number and/or arrangement of the one or more counterweights is selected to adjust the center of gravity of the camera relative to the roll axis.

8. The two-axis gimbal assembly of claim 7, wherein the pitch motor includes:
a pitch stator and a pitch rotor, the pitch stator coupled to the pitch rotor along the pitch axis, the pitch stator coupled to the second arm of the pitch support member along the pitch axis, the pitch rotor coupled to the second endwall of the camera housing along the pitch axis.

9. The two-axis gimbal assembly of claim 8, wherein the base includes a set of supporting members spaced a second distance apart to define a second gap, the second gap defines a second channel, the second channel is configured to support a pitch communication cable, the pitch communication cable coupled to the pitch motor and the control board.

10. The two-axis gimbal assembly of claim 7, wherein the pitch motor includes: a pitch stator and a pitch rotor, the pitch stator coupled to the pitch rotor along the pitch axis, the pitch stator coupled to the second endwall of the camera housing along the pitch axis, the pitch rotor coupled to the second arm of the pitch support member along the pitch axis.

11. The two-axis gimbal assembly of claim 10, wherein the channel is configured to support a pitch communication cable, the pitch communication cable coupled to the pitch motor and the control board.

12. The two-axis gimbal assembly of claim 11, wherein the pitch communication cable and the camera communication cable are a coaxial cable, the channel is configured to support the coaxial cable.

13. A support assembly for supporting a camera from an aerial system, the aerial system including a body and a flight mechanism coupled to the body, the support assembly comprising:
a pitch assembly adapted to couple to a camera housing for rotating the camera housing about a pitch axis, the pitch assembly including a pitch motor and a pitch support member, the pitch motor coupled to the pitch support member, the pitch support member including a base, a first arm, and a second arm, the second arm is opposite the first arm, the first arm and the second arm extending outwardly from the base, the first arm is configured to support a camera communication cable, the second arm coupled to the camera housing, wherein the first arm includes a pair of flanges spaced a distance apart to define a gap, the gap defines a channel, the channel is configured to support the camera communication cable;
a roll assembly coupled to the body and the pitch assembly, the roll assembly is configured to rotate the pitch assembly about a roll axis, the roll axis is perpendicular to the pitch axis, the roll assembly including a roll motor and a roll support member, the roll motor coupled to the roll support member, the roll motor coupled to a control board with a flexible printed circuit, the roll support member including an outer surface and a recessed portion defined along the outer surface, the recessed portion is configured to receive the flexible printed circuit; and,
one or more counterweights supported by one or both of the flanges of the first arm, wherein the number and/or arrangement of the one or more counterweights is selected to adjust the center of gravity of the camera relative to the roll axis.

14. The support assembly of claim 13, wherein the pitch motor includes: a pitch stator and a pitch rotor, the pitch stator coupled to the pitch rotor along the pitch axis, the pitch stator coupled to the second arm of the pitch support member along the pitch axis, the pitch rotor coupled to the camera housing along the pitch axis.

15. The support assembly of claim 14, wherein the base includes a set of supporting members spaced a second distance apart to define a second gap, the second gap defines a second channel, the second channel is configured to support a pitch communication cable, the pitch communication cable coupled to the pitch motor and the control board.

16. The support assembly of claim 13, wherein the pitch motor includes: a pitch stator and a pitch rotor, the pitch stator coupled to the pitch rotor along the pitch axis, the pitch stator coupled to the camera housing along the pitch axis, the pitch rotor coupled to the second arm of the pitch support member along the pitch axis.

17. The support assembly of claim 16, wherein the channel is configured to support a pitch communication cable, the pitch communication cable coupled to the pitch motor and the control board.

* * * * *